US012739881B2

(12) United States Patent
Lim et al.

(10) Patent No.: US 12,739,881 B2
(45) Date of Patent: Sep. 15, 2026

(54) METHOD AND DEVICE FOR PERFORMING SENSING PROCEDURE IN WIRELESS LAN SYSTEM

(71) Applicant: LG ELECTRONICS INC., Seoul (KR)

(72) Inventors: Dongguk Lim, Seoul (KR); Jinsoo Choi, Seoul (KR); Insun Jang, Seoul (KR); Sang Gook Kim, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 18/575,034

(22) PCT Filed: Jun. 28, 2022

(86) PCT No.: PCT/KR2022/009204
§ 371 (c)(1),
(2) Date: Dec. 28, 2023

(87) PCT Pub. No.: WO2023/277513
PCT Pub. Date: Jan. 5, 2023

(65) Prior Publication Data

US 2024/0306199 A1 Sep. 12, 2024

Related U.S. Application Data

(60) Provisional application No. 63/215,933, filed on Jun. 28, 2021.

(51) Int. Cl.
*H04W 74/0808* (2024.01)
*H04W 84/12* (2009.01)

(52) U.S. Cl.
CPC ........ *H04W 74/0808* (2013.01); *H04W 84/12* (2013.01)

(58) Field of Classification Search
CPC . H04W 74/0808; H04W 84/12; H04W 24/10; H04W 24/08; H04W 28/06; H04B 7/0658; H04B 7/0456; Y02D 30/70
See application file for complete search history.

(56) References Cited

U.S. PATENT DOCUMENTS

2016/0088641 A1 3/2016 Kwon et al.
2016/0233932 A1* 8/2016 Hedayat ................ H04L 5/0048
(Continued)

FOREIGN PATENT DOCUMENTS

CN 112748425 5/2021
WO 2021083368 5/2021
(Continued)

OTHER PUBLICATIONS

PCT International Application No. PCT/KR2022/009204, International Search Report dated Oct. 7, 2022, 3 pages.
(Continued)

*Primary Examiner* — Kibrom T Hailu
(74) *Attorney, Agent, or Firm* — LEE, HONG, DEGERMAN, KANG & WAIMEY

(57) ABSTRACT

Disclosed are a method and device for performing a sensing procedure in a wireless LAN system. The method for performing a sensing procedure in a wireless LAN system by means of a first station (STA) comprises the steps of: receiving, from a second STA, a first NDP announcement frame including a sounding dialog token field; and transmitting, to the second STA, at least one feedback fragment constituting a first feedback frame, wherein the sounding dialog token field includes a first sounding dialog token number and information that indicates that a modification form of the first NDP announcement frame is a sensing NDP announcement frame, and the at least one feedback fragment
(Continued)

can be transmitted on the basis of a first trigger frame including the first sounding dialog token number.

10 Claims, 15 Drawing Sheets

(56) References Cited

U.S. PATENT DOCUMENTS

| | | | | |
|---|---|---|---|---|
| 2016/0254884 | A1* | 9/2016 | Hedayat | H04B 7/063 370/329 |
| 2018/0359761 | A1* | 12/2018 | Chun | H04W 72/21 |
| 2020/0059808 | A1* | 2/2020 | Lim | H04W 72/04 |
| 2020/0132857 | A1 | 4/2020 | Berger et al. | |
| 2020/0359248 | A1 | 11/2020 | Sadeghi et al. | |
| 2021/0377368 | A1* | 12/2021 | Han | H04L 69/18 |
| 2023/0319877 | A1* | 10/2023 | Chitrakar | H04W 74/0808 370/329 |

FOREIGN PATENT DOCUMENTS

| | | |
|---|---|---|
| WO | 2022-124869 | 6/2022 |
| WO | 2022-203361 | 9/2022 |

OTHER PUBLICATIONS

Lee, "D0.3 CR for Spatial Stream And MIMO Enhancement," IEEE 802.11-21/0272r4, Apr. 2021, 31 pages.

Li et al., "Non-AP STA TXOP Frame Bursting Testing," IEEE 802.11-20/1076r1, Jul. 2020, 24 pages.

European Patent Office Application Serial No. 22833569.1, Search Report dated Jun. 3, 2025, 12 pages.

Trainin et al., "Sensing session and measurement exchange identification," IEEE 802.11-21/0644r3, May 2021, 14 pages.

Chen et al., "WLAN Sensing Definitions," IEEE 802.11-20/0807r1, Jun. 2020, 12 pages.

Korean Intellectual Property Office Application No. 10-2024-7000012, Office Action dated May 21, 2026, 7 pages.

* cited by examiner

200
Second Device
Processor(s)
Memory(s)
Transceiver(s)
202
204
206
208
108
100
First Device
Transceiver(s)
Processor(s)
Memory(s)
106
102
104

FIG.6

STF | LTF | SIG | ... | DATA

SERVICE | PSDU | PPDU TAIL | PAD

| OCTETS: 2 | 2 | 6 | 6 | 6 | 2 | 6 | 2 | 4 | 0~7951 | 4 |
|---|---|---|---|---|---|---|---|---|---|---|
| FRAME CONTROL | DURATION /ID | ADDRESS 1 | ADDRESS 2 | ADDRESS 3 | SEQUENCE CONTROL | ADDRESS 4 | QoS CONTROL | HT CONTROL | FRAME BODY | FCS |

MAC HEADER

FIG.7
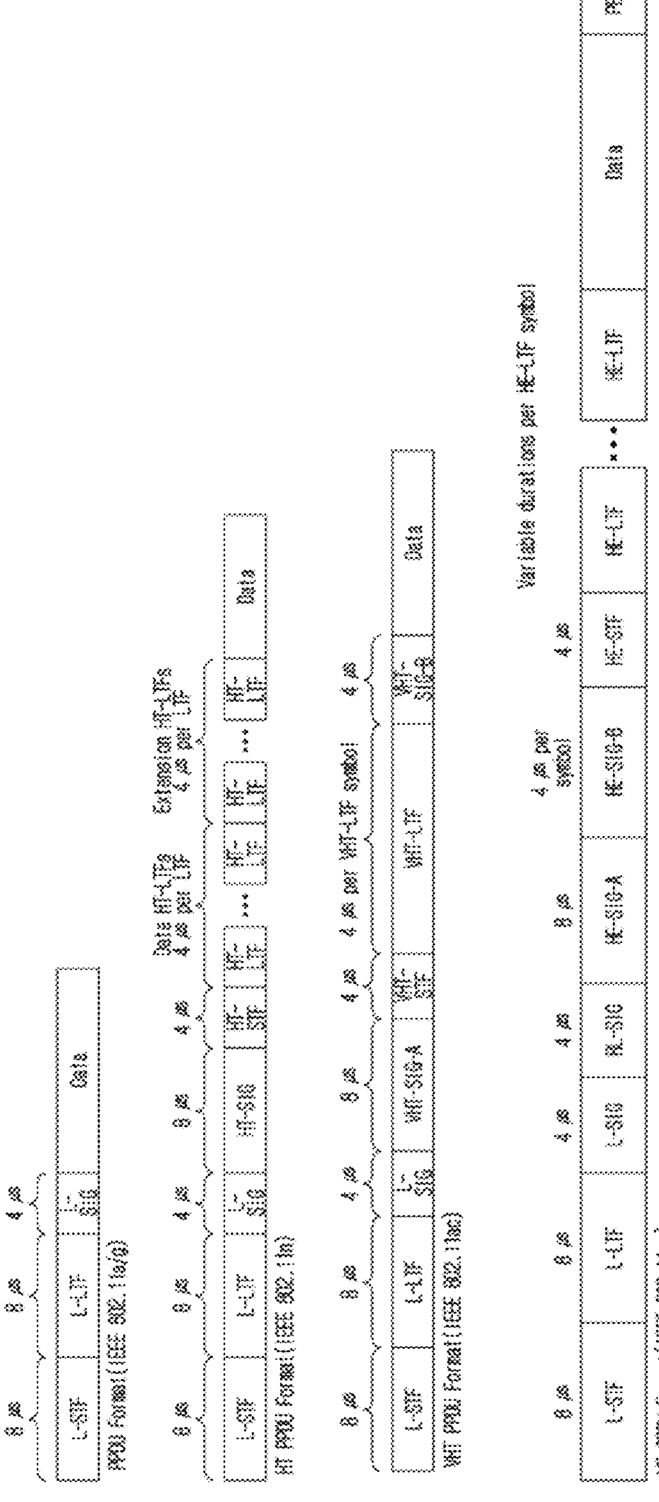

FIG. 18

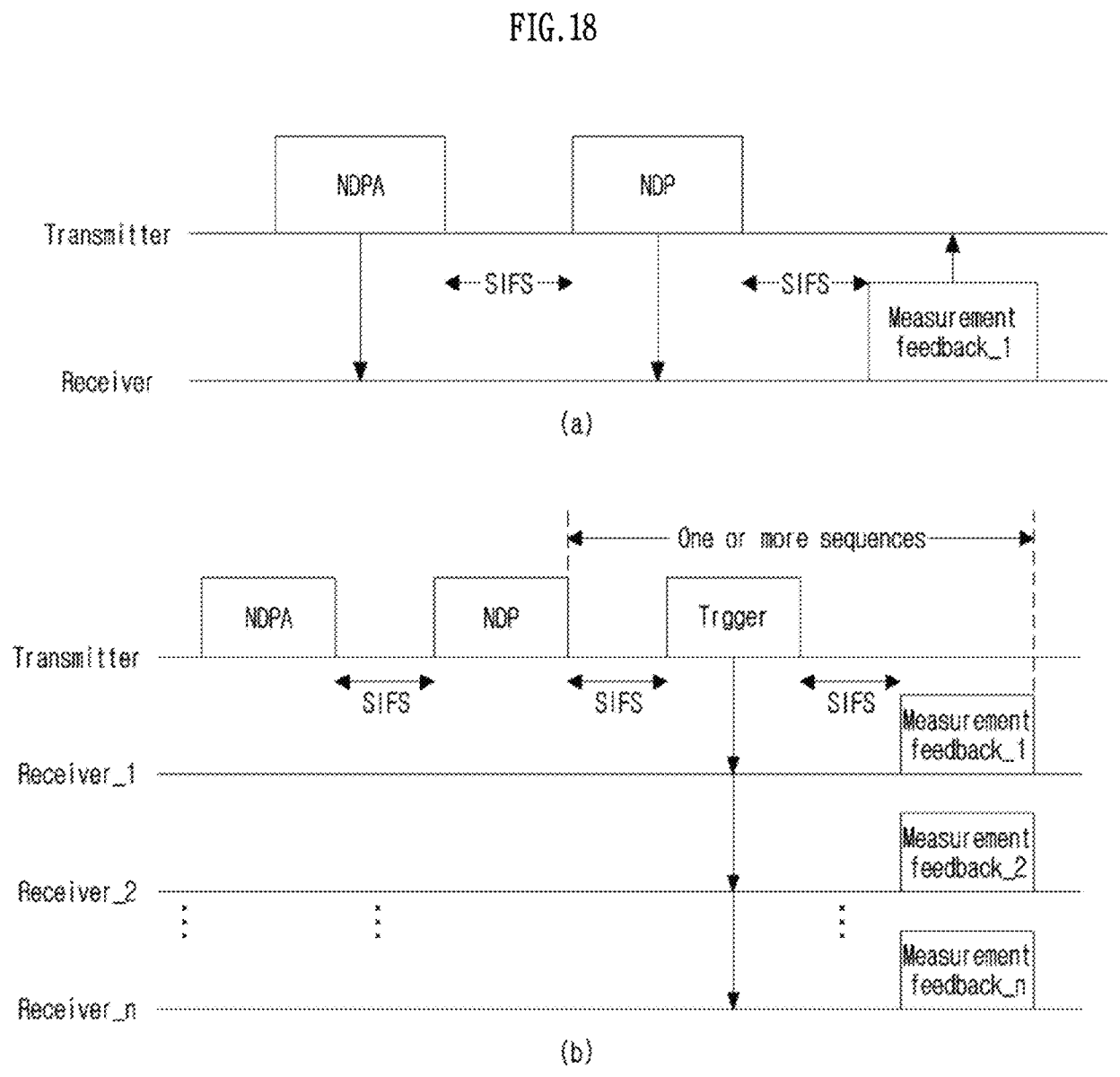

Transmitter
Receiver
NDPA
NDP
SIFS
SIFS
Measurement feedback_1
(a)

One or more sequences
Transmitter
NDPA
NDP
Trigger
SIFS
SIFS
SIFS
Receiver_1
Receiver_2
Receiver_n
Measurement feedback_1
Measurement feedback_2
Measurement feedback_n
(b)

METHOD AND DEVICE FOR PERFORMING SENSING PROCEDURE IN WIRELESS LAN SYSTEM

CROSS-REFERENCE TO RELATED APPLICATIONS

This application is the National Stage filing under 35 U.S.C. 371 of International Application No. PCT/KR2022/009204, filed on Jun. 28, 2022, which claims the benefit of U.S. Provisional Application No. 63/215,933, filed on Jun. 28, 2021, the contents of which are all hereby incorporated by reference herein in their entireties.

TECHNICAL FIELD

The present disclosure relates to a method and device for performing communication in a Wireless Local Area Network (WLAN) system, and more specifically, to a method and device for performing a sensing procedure in a next-generation wireless LAN system.

BACKGROUND ART

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

Improvement technologies for providing sensing for devices using wireless LAN signals are being discussed. For example, in IEEE 802.11 task group (TG) bf, standard technology is being developed to perform sensing of objects (e.g., people, objects, etc.) based on channel estimation using wireless LAN signals between devices operating in the frequency band below 7 GHz. Object sensing based on wireless LAN signals has the advantage of utilizing existing frequency bands and has a lower possibility of privacy infringement compared to existing sensing technologies. As the frequency range used in wireless LAN technology increases, precise sensing information can be obtained, and technologies for reducing power consumption to efficiently support precise sensing procedures are also being researched.

SUMMARY

The technical problem of the present disclosure is to provide a method and device for performing a sensing procedure in a wireless LAN system.

An additional technical problem of the present disclosure is to provide a method and device for transmitting and receiving one or more fragment information constituting sensing measurement information in a wireless LAN system.

An additional technical task of the present disclosure is to provide a method and device for triggering sensing measurement results in a specific sensing burst using a sounding dialog token number in a wireless LAN system.

The technical objects to be achieved by the present disclosure are not limited to the above-described technical objects, and other technical objects which are not described herein will be clearly understood by those skilled in the pertinent art from the following description.

According to an aspect of the present disclosure, a method of performing a sensing procedure by a first station (STA) in a wireless LAN system may include receiving, from a second STA, a first null data physical protocol data unit (NDP) announcement frame including a sounding dialog token field; and transmitting, to the second STA, at least one feedback fragment constituting a first feedback frame, and the sounding dialog token field includes information indicating that a variant of the first NDP announcement frame is a sensing NDP announcement frame and a first sounding dialog token number, and the at least one feedback fragments are transmitted based on a first trigger frame including the first sounding dialog token number.

According to an additional aspect of the present disclosure, a method of performing a sensing procedure by a second station (STA) in a wireless LAN system may include transmitting, to a first STA, a first null data physical protocol data unit (NDP) announcement frame including a sounding dialog token field; and receiving, from the first STA, at least one feedback fragment constituting a first feedback frame, and the sounding dialog token field includes information indicating that a variant of the first NDP announcement frame is a sensing NDP announcement frame and a first sounding dialog token number, and the at least one feedback fragments are transmitted based on a first trigger frame including the first sounding dialog token number.

According to the present disclosure, a method and device for performing a sensing procedure in a wireless LAN system may be provided.

According to the present disclosure, a method and device for transmitting and receiving one or more fragment information constituting sensing measurement information in a wireless LAN system may be provided.

According to the present disclosure, a method and device for triggering a sensing measurement result in a specific sensing burst using a sounding dialog token number in a wireless LAN system may be provided.

According to the present disclosure, even large-sized data can be efficiently fed back by dividing and transmitting sensing measurement information.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 is a diagram for describing an example of a frame structure used in a WLAN system to which the present disclosure may be applied.

FIG. 7 is a diagram illustrating examples of PPDUs defined in the IEEE 802.11 standard to which the present disclosure may be applied.

FIG. 18 is a diagram for describing a Non-TB/TB sensing procedure to which the present disclosure may be applied.

FIG. 19 shows an example of a feedback fragment to which the present disclosure may be applied.

DETAILED DESCRIPTION

Figure 1:
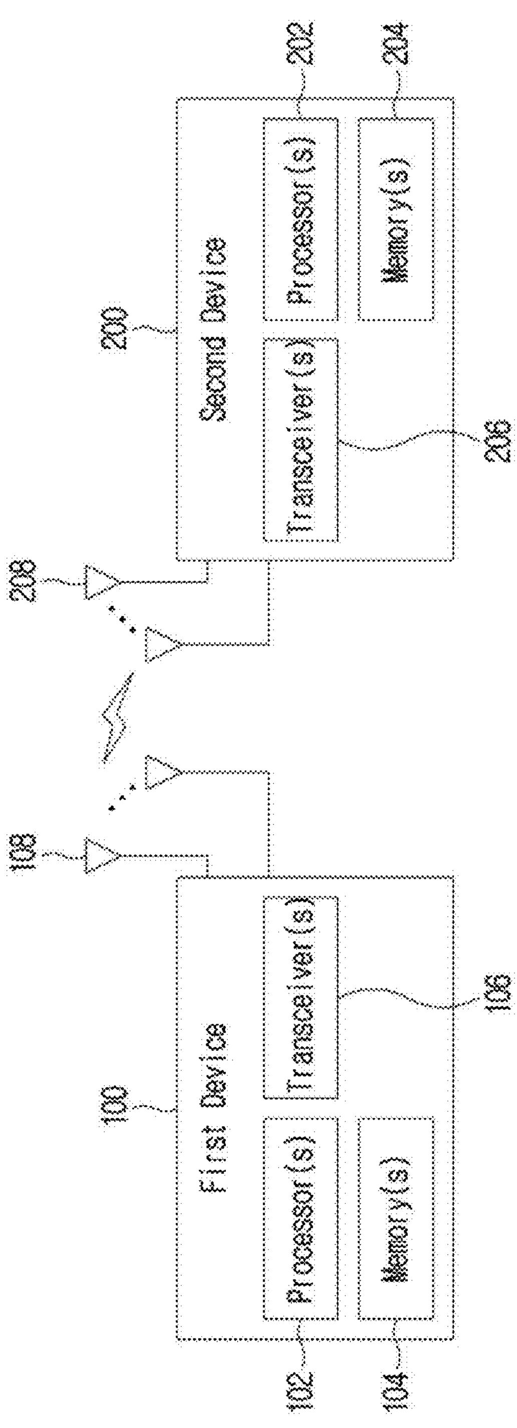
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs (Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) determining/acquiring/configuring/calculating/decoding/encoding bit information of fields (signal (SIG), short training field (STF), long training field (LTF), Data, etc.) included in the PPDU, 2) determining/configuring/acquiring time resources or frequency resources (e.g., subcarrier resources) used for fields (SIG, STF, LTF, Data, etc.) included in the PPDU; 3) determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
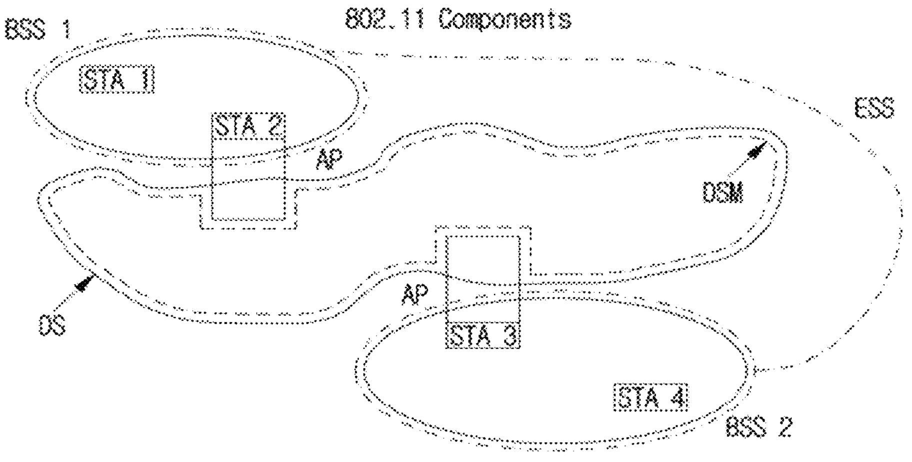
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
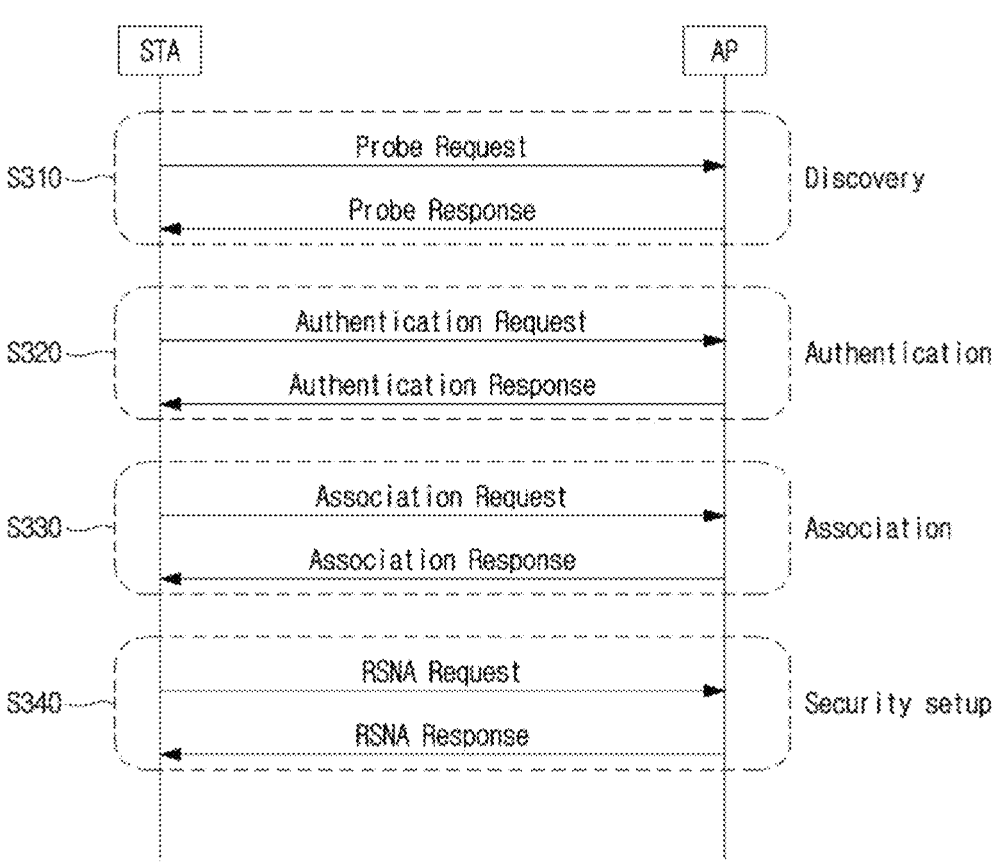
FIG. 3 is a diagram for describing a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QoS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
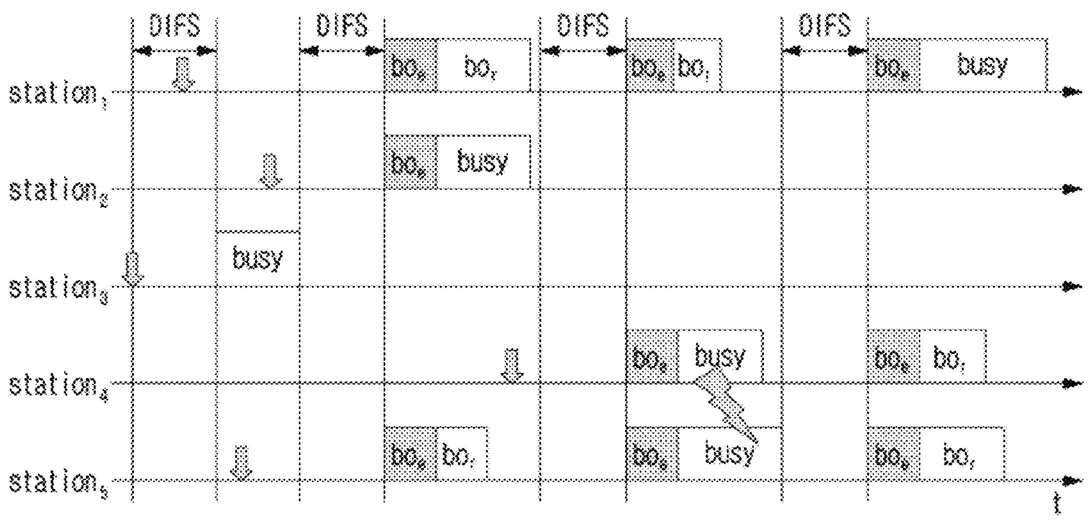
FIG. 4 is a diagram for describing a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a “listen before talk” access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to 2n−1 (n=0, 1, 2, . . . ).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STAT, STA2, and STA5, and each STA waits as long as DIFS when the medium is monitored as idle, and then may perform a countdown of the backoff slot according to the random backoff count value selected by each STA. Assume that STA2 selects the smallest backoff count value and STAT selects the largest backoff count value. That is, the case where the remaining back-off time of STA5 is shorter than the remaining back-off time of STAT at the time when STA2 completes the back-off count and starts frame transmission is exemplified. STAT and STA5 temporarily stop counting down and wait while STA2 occupies the medium. When the occupation of STA2 ends and the medium becomes idle again, STAT and STA5 wait for DIFS and resume the stopped backoff count. That is, frame transmission may be started after counting down the remaining backoff slots for the remaining backoff time. Since the remaining backoff time of STA5 is shorter than that of STAT, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STAT waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (BlockACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QoS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
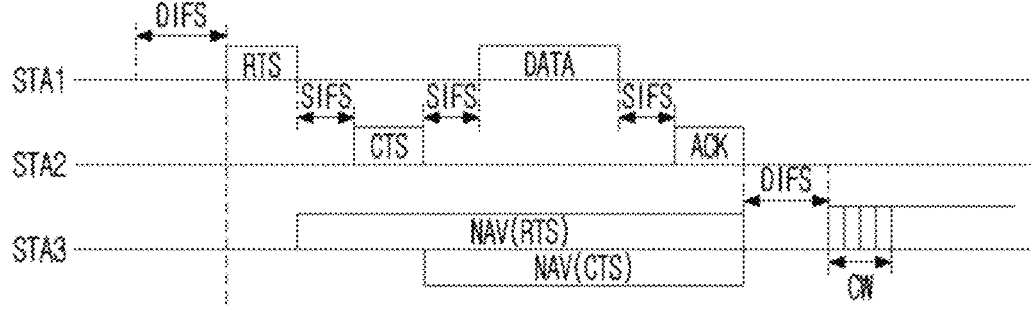
FIG. 5 is a diagram for describing a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STAT and the STA2, a STA outside the transmission range of one of the STAT or the STA2, or a STA outside the carrier sensing range for transmission from the STAT or the STA3 may not attempt to occupy the channel during data transmission and reception between the STAT and the STA2.

Specifically, the STAT may determine whether a channel is being used through carrier sensing. In terms of physical carrier sensing, the STAT may determine a channel occupation idle state based on an energy level or signal correlation detected in a channel. In addition, in terms of virtual carrier sensing, the STAT may determine a channel occupancy state using a network allocation vector (NAV) timer.

The STAT may transmit an RTS frame to the STA2 after performing a backoff when the channel is in an idle state during DIFS. When the STA2 receives the RTS frame, the STA2 may transmit a CTS frame as a response to the RTS frame to the STAT after SIFS.

If the STA3 cannot overhear the CTS frame from the STA2 but can overhear the RTS frame from the STAT, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STAT, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STAT or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STAT receives the CTS frame from the STA2, the STAT may transmit the data frame to the STA2 after SIFS from the time point when the reception of the CTS frame is completed. When the STA2 successfully receives the data frame, the STA2 may transmit an ACK frame as a response to the data frame to the STAT after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU frame may include a Short Training Field (STF), a Long Training Field (LTF), a SIGNAL (SIG) field, and a Data field. The most basic (e.g., non-High Throughput (HT)) PPDU frame format may consist of only L-STF (Legacy-STF), L-LTF (Legacy-LTF), SIG field, and data field. In addition, depending on the type of PPDU frame format (e.g., HT-mixed format PPDU, HT-greenfield format PPDU, VHT (Very High Throughput) PPDU, etc.), an additional (or different type) STF, LTF, and SIG fields may be included between the SIG field and the data field (this will be described later with reference to FIG. 7).

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include a RATE field and a LENGTH field. The RATE field may include information on modulation and coding rates of data. The LENGTH field may include information on the length of data. Additionally, the SIG field may include a parity bit, a SIG TAIL bit, and the like.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

A null-data packet (NDP) frame format means a frame format that does not include a data packet. That is, the NDP frame refers to a frame format that includes a physical layer convergence procedure (PLCP) header part (i.e., STF, LTF, and SIG fields) in a general PPDU frame format and does not include the remaining parts (i.e., data field). A NDP frame may also be referred to as a short frame format.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format.

The HT PPDU format (IEEE 802.11n) additionally includes HT-SIG, HT-STF, and HT-LFT(s) fields to the basic PPDU format. The HT PPDU format shown in FIG. 7 may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format.

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format. Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16us.

Figure 8:
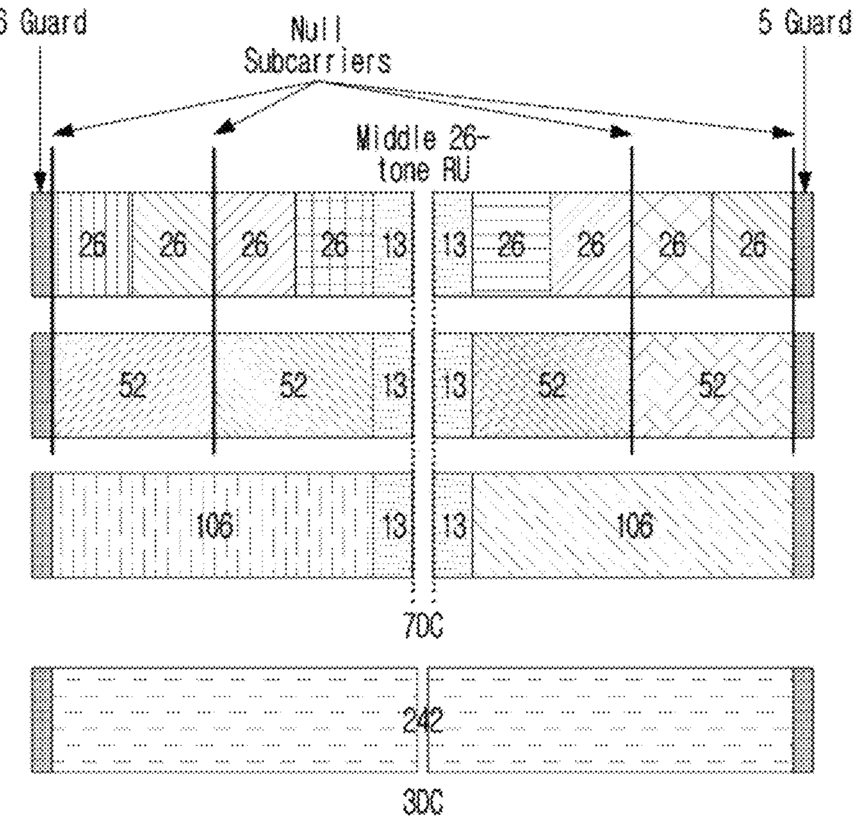
FIGS. 8 to 10 are diagrams for describing examples of resource units of a WLAN system to which the present disclosure may be applied.
Figure 9:
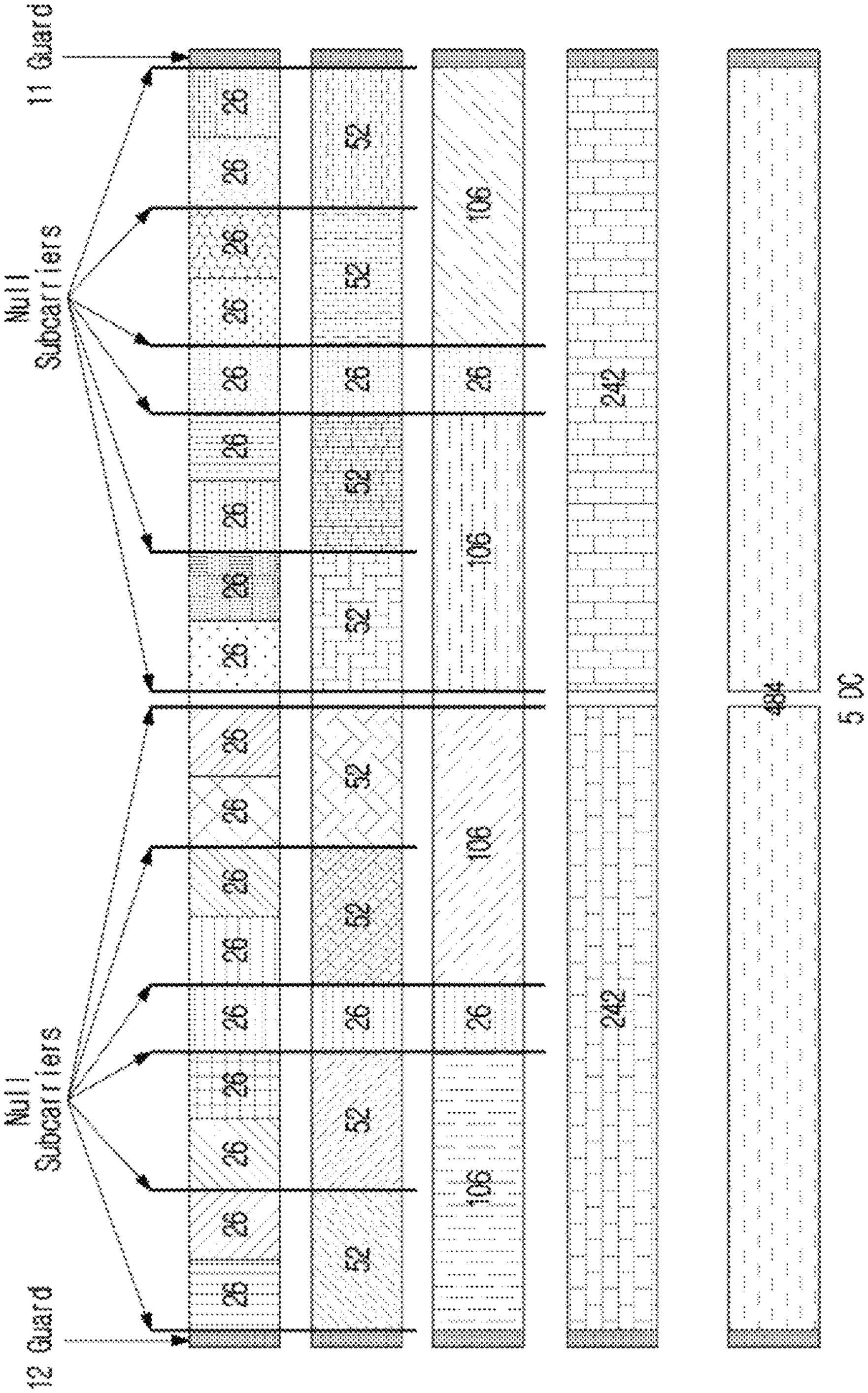
Figure 10:
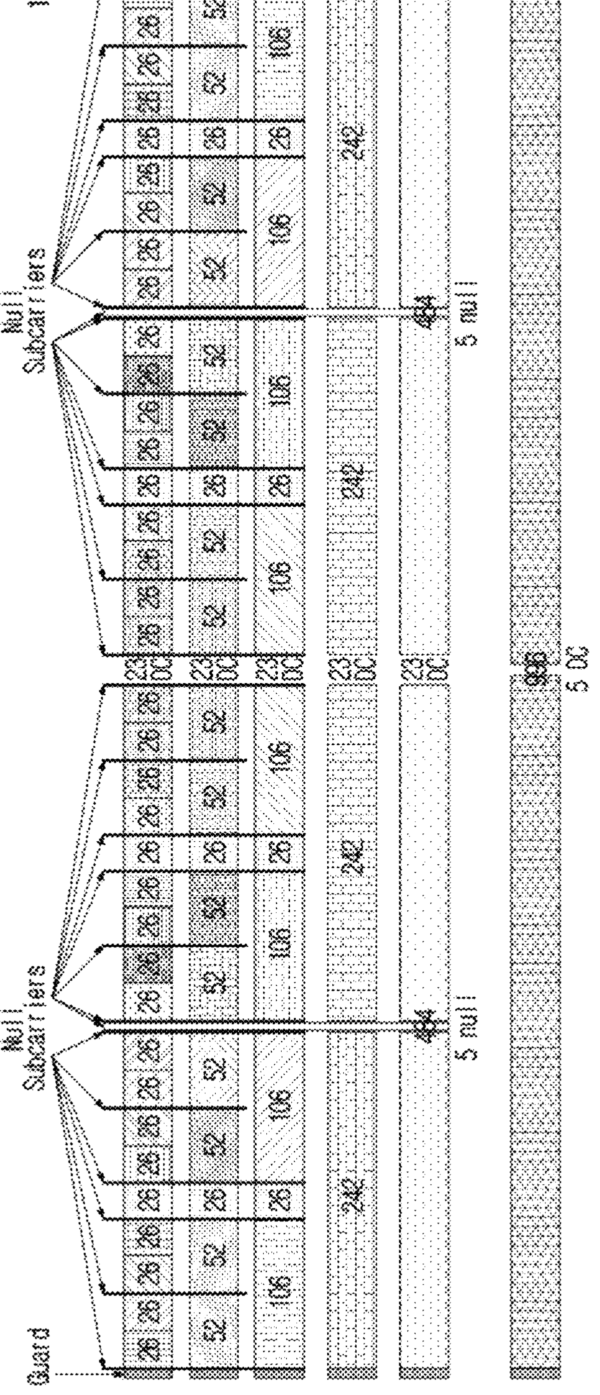

FIGS. 8 to 10 are diagrams for explaining examples of resource units of a WLAN system to which the present disclosure may be applied.

Referring to FIGS. 8 to 10, a resource unit (RU) defined in a wireless LAN system will be described. the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHz, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHz, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used.

FIG. 10 is a diagram illustrating an exemplary allocation of resource units (RUs) used on an 80 MHz band.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHz PPDU, RU allocation of HE PPDUs and EHT PPDUs may be different, and the example of FIG. 10 shows an example of RU allocation for 80 MHz EHT PPDUs. The scheme that 12 tones are used as a guard band in the leftmost band of the 80 MHz band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHz subblocks in FIG. 10. The RU allocation for each 80 MHz subblock may be the same as that of the 80 MHz EHT PPDU of FIG. 10. If the 80 MHz subblock of the 160 MHz or 320 MHz EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2×996+484-tone, 3×996-tone, or 3×996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHz subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. That is, the transmitting STA (e.g., AP) may transmit the HE-STF, HE-LTF, and Data fields for the first STA through the first RU within one MU PPDU, and may transmit the HE-STF, HE-LTF, and Data fields for the second STA through the second RU.

Information on the allocation of RUs may be signaled through HE-SIG-B in the HE PPDU format.

Figure 11:
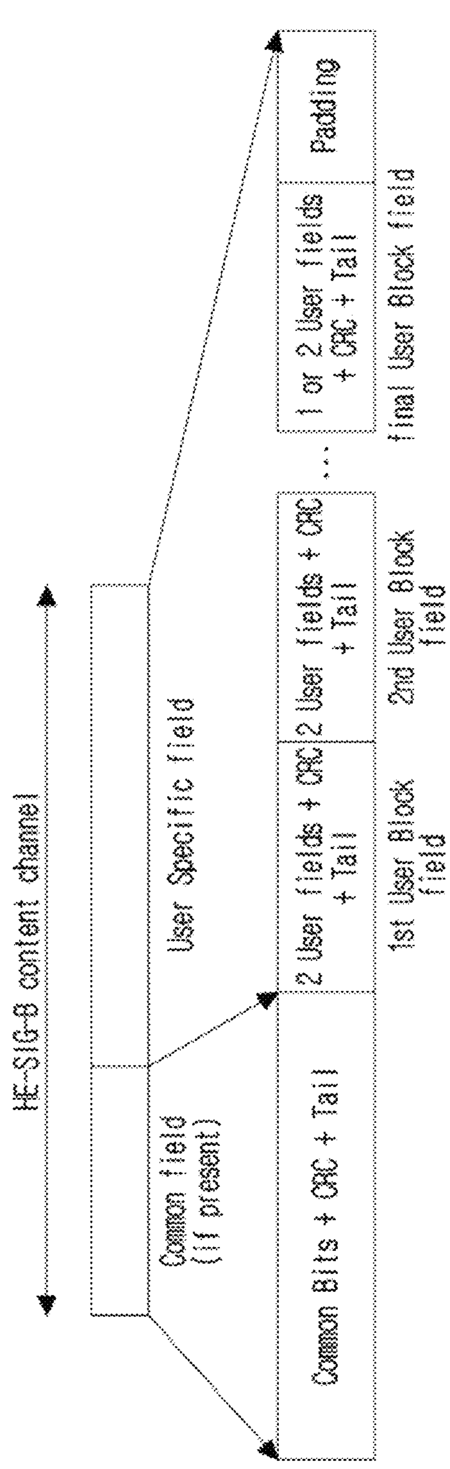
FIG. 11 illustrates an example structure of a HE-SIG-B field.

FIG. 11 illustrates an example structure of a HE-SIG-B field.

As shown, the HE-SIG-B field may include a common field and a user-specific field. If HE-SIG-B compression is applied (e.g., full-bandwidth MU-MIMO transmission), the common field may not be included in HE-SIG-B, and the HE-SIG-B content channel may include only a user-specific field. If HE-SIG-B compression is not applied, the common field may be included in HE-SIG-B.

The common field may include information on RU allocation (e.g., RU assignment, RUs allocated for MU-MIMO, the number of MU-MIMO users (STAs), etc.)

The common field may include N*8 RU allocation subfields. Here, N is the number of subfields, N=1 in the case of 20 or 40 MHz MU PPDU, N=2 in the case of 80 MHz MU PPDU, N=4 in the case of 160 MHz or 80+80 MHz MU PPDU, etc. One 8-bit RU allocation subfield may indicate the size (26, 52, 106, etc.) and frequency location (or RU index) of RUs included in the 20 MHz band.

For example, if a value of the 8-bit RU allocation subfield is 00000000, it may indicate that nine 26-RUs are sequentially allocated in order from the leftmost to the rightmost in the example of FIG. 8, if the value is 00000001, it may indicate that seven 26-RUs and one 52-RU are sequentially allocated in order from leftmost to rightest, and if the value is 00000010, it may indicate that five 26-RUs, one 52-RU, and two 26-RUs are sequentially allocated from the leftmost side to the rightmost side.

As an additional example, if the value of the 8-bit RU allocation subfield is 01000y2y1y0, it may indicate that one 106-RU and five 26-RUs are sequentially allocated from the leftmost to the rightmost in the example of FIG. 8. In this case, multiple users/STAs may be allocated to the 106-RU in the MU-MIMO scheme. Specifically, up to 8 users/STAs may be allocated to the 106-RU, and the number of users/STAs allocated to the 106-RU is determined based on 3-bit information (i.e., y2y1y0). For example, when the 3-bit information (y2y1y0) corresponds to a decimal value N, the number of users/STAs allocated to the 106-RU may be N+1.

Basically, one user/STA may be allocated to each of a plurality of RUs, and different users/STAs may be allocated to different RUs. For RUs larger than a predetermined size (e.g., 106, 242, 484, 996-tones, . . . ), a plurality of users/STAs may be allocated to one RU, and MU-MIMO scheme may be applied for the plurality of users/STAs.

The set of user-specific fields includes information on how all users (STAs) of the corresponding PPDU decode their payloads. User-specific fields may contain zero or more user block fields. The non-final user block field includes two user fields (i.e., information to be used for decoding in two STAs). The final user block field contains one or two user fields. The number of user fields may be indicated by the RU allocation subfield of HE-SIG-B, the number of symbols of HE-SIG-B, or the MU-MIMO user field of HE-SIG-A. A User-specific field may be encoded separately from or independently of a common field.

Figure 12:
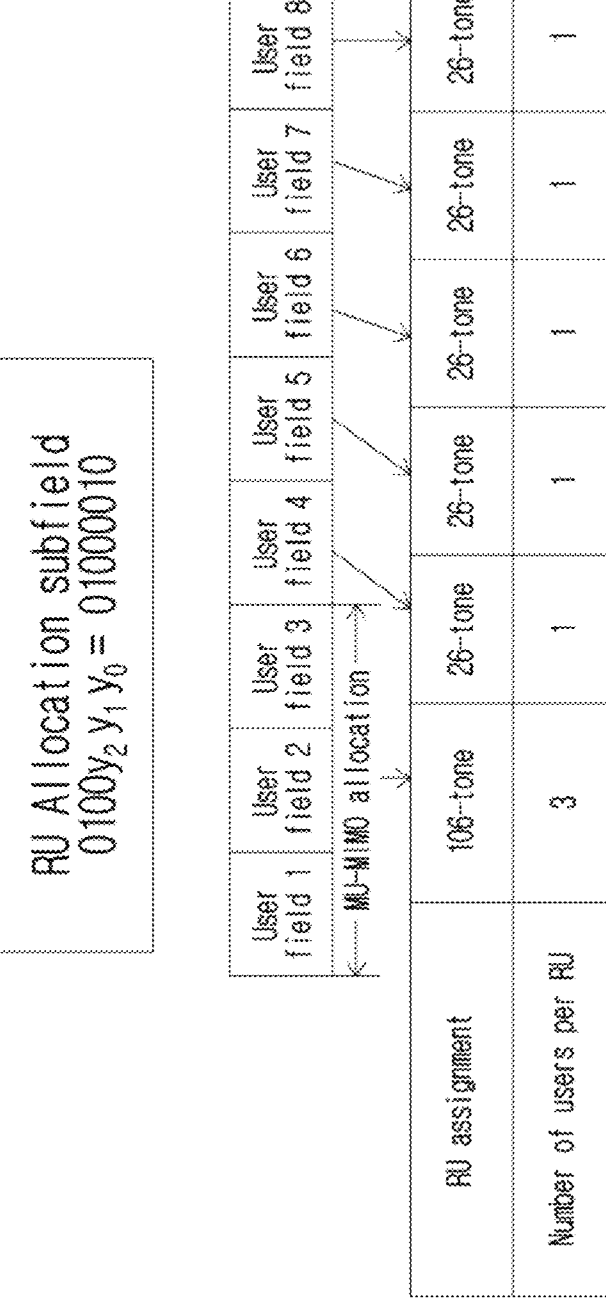
FIG. 12 is a diagram for describing a MU-MIMO method in which a plurality of users/STAs are allocated to one RU.

FIG. 12 is a diagram for explaining a MU-MIMO method in which a plurality of users/STAs are allocated to one RU.

In the example of FIG. 12, it is assumed that the value of the RU allocation subfield is 01000010. This corresponds to the case where y2y1y0=010 in 01000y2y1y0. 010 corresponds to 2 in decimal (i.e., N=2) and may indicate that 3 (=N+1) users are allocated to one RU. In this case, one 106-RU and five 26-RUs may be sequentially allocated from the leftmost side to the rightmost side of a specific 20 MHz band/channel. Three users/STAs may be allocated to the 106-RU in a MU-MIMO manner. As a result, a total of 8 users/STAs are allocated to the 20 MHz band/channel, and the user-specific field of HE-SIG-B may include 8 user fields (i.e., 4 user block fields). Eight user fields may be assigned to RUs as shown in FIG. 12.

The user field may be constructed based on two formats. The user field for a MU-MIMO allocation may be constructed with a first format, and the user field for non-MU-MIMO allocation may be constructed with a second format. Referring to the example of FIG. 12, user fields 1 to 3 may be based on the first format, and user fields 4 to 8 may be based on the second format. The first format and the second format may contain bit information of the same length (e.g., 21 bits).

The user field of the first format (i.e., format for MU-MIMO allocation) may be constructed as follows. For example, out of all 21 bits of one user field, B0-B10 includes the user's identification information (e.g., STA-ID, AID, partial AID, etc.), BTT-14 includes spatial configuration information such as the number of spatial streams for the corresponding user, B15-B18 includes Modulation and Coding Scheme (MCS) information applied to the Data field of the corresponding PPDU, B19 is defined as a reserved field, and B20 may include information on a coding type (e.g., binary convolutional coding (BCC) or low-density parity check (LDPC)) applied to the Data field of the corresponding PPDU.

The user field of the second format (i.e., the format for non-MU-MIMO allocation) may be constructed as follows. For example, out of all 21 bits of one user field, B0-B10 includes the user's identification information (e.g., STA-ID, AID, partial AID, etc.), B11-13 includes information on the number of spatial streams (NSTS) applied to the corresponding RU, B14 includes information indicating whether beamforming is performed (or whether a beamforming steering matrix is applied), B15-B18 includes Modulation and Coding Scheme (MCS) information applied to the Data field of the corresponding PPDU, B19 includes information indicating whether DCM (dual carrier modulation) is applied, and B20 may include information on a coding type (e.g., BCC or LDPC) applied to the Data field of the corresponding PPDU.

MCS, MCS information, MCS index, MCS field, and the like used in the present disclosure may be indicated by a specific index value. For example, MCS information may be indicated as index 0 to index 11. MCS information includes information on constellation modulation type (e.g., BPSK, QPSK, 16-QAM, 64-QAM, 256-QAM, 1024-QAM, etc.), and coding rate (e.g., ½, ⅔, ¾, ⅚, etc.). Information on a channel coding type (e.g., BCC or LDPC) may be excluded from the MCS information.

Figure 13:
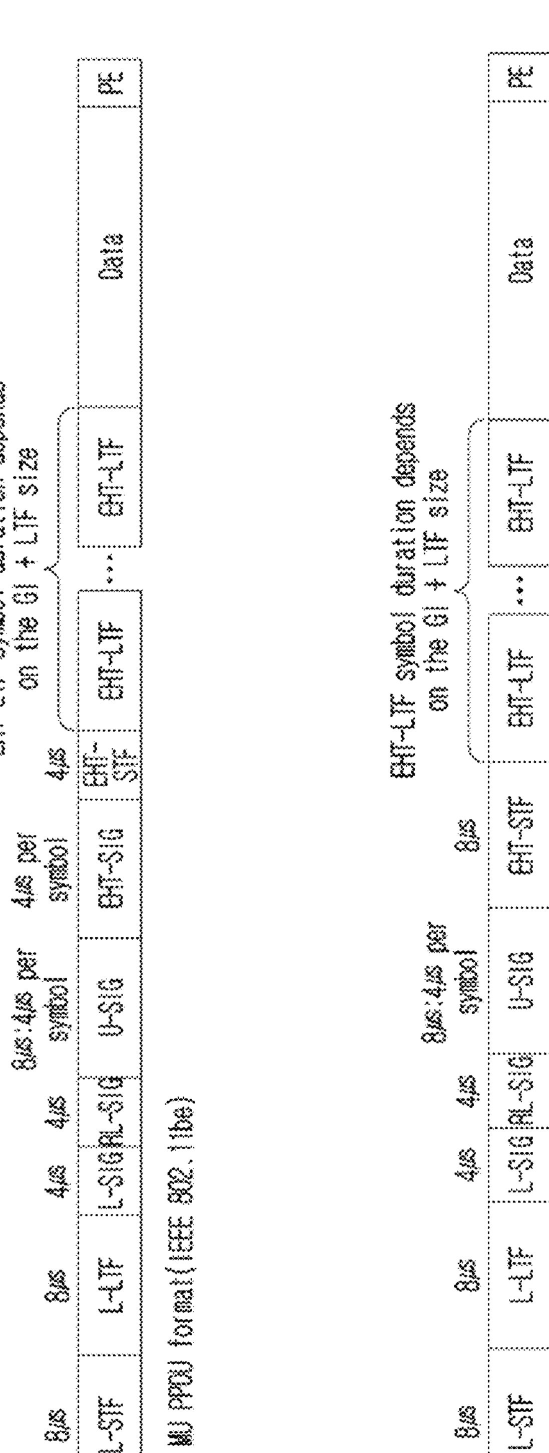
FIG. 13 illustrates an example of a PPDU format to which the present disclosure may be applied.

FIG. 13 illustrates an example of a PPDU format to which the present disclosure may be applied.

The PPDU of FIG. 13 may be referred as various names such as an EHT PPDU, a transmitted PPDU, a received PPDU, a first type or an Nth type PPDU. For example, the PPDU or EHT PPDU of the present disclosure may be referred as various names such as a transmission PPDU, a reception PPDU, a first type or an Nth type PPDU. In addition, the EHT PPU may be used in an EHT system and/or a new wireless LAN system in which the EHT system is improved.

The EHT MU PPDU of FIG. 13 corresponds to a PPDU carrying one or more data (or PSDUs) for one or more users. That is, the EHT MU PPDU may be used for both SU transmission and MU transmission. For example, the EHT MU PPDU may correspond to a PPDU for one receiving STA or a plurality of receiving STAs.

In the EHT TB PPDU of FIG. 13, the EHT-SIG is omitted compared to the EHT MU PPDU. Upon receiving a trigger for UL MU transmission (e.g., a trigger frame or TRS), the STA may perform UL transmission based on the EHT TB PPDU format.

In the example of the EHT PPDU format of FIG. 13, L-STF to EHT-LTF correspond to a preamble or a physical preamble, and may be generated/transmitted/received/acquired/decoded in the physical layer.

A Subcarrier frequency spacing of L-STF, L-LTF, L-SIG, RL-SIG, Universal SIGNAL (U-SIG), EHT-SIG field (these are referred to as pre-EHT modulated fields) may be set to 312.5 kHz. A subcarrier frequency spacing of the EHT-STF, EHT-LTF, Data, and PE field (these are referred to as EHT modulated fields) may be set to 78.125 kHz. That is, the tone/subcarrier index of L-STF, L-LTF, L-SIG, RL-SIG, U-SIG, and EHT-SIG field may be indicated in units of 312.5 kHz, and the tone/subcarrier index of EHT-STF, EHT-LTF, Data, and PE field may be indicated in units of 78.125 kHz.

The L-LTF and L-STF of FIG. 13 may be constructed identically to the corresponding fields of the PPDU described in FIGS. 6 to 7.

The L-SIG field of FIG. 13 may be constructed with 24 bits and may be used to communicate rate and length information. For example, the L-SIG field includes a 4-bit Rate field, a 1-bit Reserved bit, a 12-bit Length field, a 1-bit Parity field, and a 6-bit Tail field may be included. For example, the 12-bit Length field may include information on a time duration or a length of the PPDU. For example, a value of the 12-bit Length field may be determined based on the type of PPDU. For example, for a non-HT, HT, VHT, or EHT PPDU, the value of the Length field may be determined as a multiple of 3. For example, for the HE PPDU, the value of the Length field may be determined as a multiple of 3+1 or a multiple of 3+2.

For example, the transmitting STA may apply BCC encoding based on a coding rate of ½ to 24-bit information of the L-SIG field. Thereafter, the transmitting STA may obtain 48-bit BCC coded bits. BPSK modulation may be applied to 48-bit coded bits to generate 48 BPSK symbols. The transmitting STA may map 48 BPSK symbols to any location except for a pilot subcarrier (e.g., {subcarrier index −21, −7, +7, +21}) and a DC subcarrier (e.g., {subcarrier index 0}). As a result, 48 BPSK symbols may be mapped to subcarrier indices −26 to −22, −20 to −8, −6 to −1, +1 to +6, +8 to +20, and +22 to +26. The transmitting STA may additionally map the signals of {−1, −1, −1, 1} to the subcarrier index {−28, −27, +27, +28}. The above signal may be used for channel estimation in the frequency domain corresponding to {−28, −27, +27, +28}.

The transmitting STA may construct RL-SIG which is constructed identically to L-SIG. For RL-SIG, BPSK modulation is applied. The receiving STA may recognize that the received PPDU is a HE PPDU or an EHT PPDU based on the existence of the RL-SIG.

After the RL-SIG of FIG. 13, a Universal SIG (U-SIG) may be inserted. The U-SIG may be referred as various names such as a first SIG field, a first SIG, a first type SIG, a control signal, a control signal field, and a first (type) control signal, etc.

The U-SIG may include N-bit information and may include information for identifying the type of EHT PPDU. For example, U-SIG may be configured based on two symbols (e.g., two consecutive OFDM symbols). Each symbol (e.g., OFDM symbol) for the U-SIG may have a duration of 4us, and the U-SIG may have a total 8us duration. Each symbol of the U-SIG may be used to transmit 26 bit information. For example, each symbol of the U-SIG may be transmitted and received based on 52 data tones and 4 pilot tones.

Through the U-SIG (or U-SIG field), for example, A bit information (e.g., 52 un-coded bits) may be transmitted, the first symbol of the U-SIG (e.g., U-SIG-1) may transmit the first X bit information (e.g., 26 un-coded bits) of the total A bit information, and the second symbol of the U-SIG (e.g., U-SIG-2) may transmit the remaining Y-bit information (e.g., 26 un-coded bits) of the total A-bit information. For example, the transmitting STA may obtain 26 un-coded bits included in each U-SIG symbol. The transmitting STA may generate 52-coded bits by performing convolutional encoding (e.g., BCC encoding) based on a rate of R=½, and perform interleaving on the 52-coded bits. The transmitting STA may generate 52 BPSK symbols allocated to each U-SIG symbol by performing BPSK modulation on the interleaved 52-coded bits. One U-SIG symbol may be transmitted based on 56 tones (subcarriers) from subcarrier index −28 to subcarrier index +28, except for DC index 0. The 52 BPSK symbols generated by the transmitting STA may be transmitted based on the remaining tones (subcarriers) excluding pilot tones −21, −7, +7, and +21 tones.

For example, the A bit information (e.g., 52 un-coded bits) transmitted by the U-SIG includes a CRC field (e.g., a 4-bit field) and a tail field (e.g., 6 bit-length field). The CRC field and the tail field may be transmitted through the second symbol of the U-SIG. The CRC field may be constructed based on 26 bits allocated to the first symbol of U-SIG and 16 bits remaining except for the CRC/tail field in the second symbol, and may be constructed based on a conventional CRC calculation algorithm. In addition, the tail field may be used to terminate the trellis of the convolution decoder, and for example, the tail field may be set to 0.

A bit information (e.g., 52 un-coded bits) transmitted by the U-SIG (or U-SIG field) may be divided into version-independent bits and version-independent bits. For example, a size of the version-independent bits may be fixed or variable. For example, the version-independent bits may be allocated only to the first symbol of U-SIG, or the version-independent bits may be allocated to both the first symbol and the second symbol of U-SIG. For example, the version-independent bits and the version-dependent bits may be referred as various names such as a first control bit and a second control bit, etc.

For example, the version-independent bits of the U-SIG may include a 3-bit physical layer version identifier (PHY version identifier). For example, the 3-bit PH-Y version identifier may include information related to the PHY version of the transmitted/received PPDU. For example, the first value of the 3-bit PHY version identifier may indicate that the transmission/reception PPDU is an EHT PPDU. In other words, when transmitting the EHT PPDU, the transmitting STA may set the 3-bit PHY version identifier to a first value. In other words, the receiving STA may determine that the received PPDU is an EHT PPDU based on the PHY version identifier having the first value.

For example, the version-independent bits of U-SIG may include a 1-bit UL/DL flag field. A first value of the 1-bit UL/DL flag field is related to UL communication, and a second value of the UL/DL flag field is related to DL communication.

For example, the version-independent bits of the U-SIG may include information on the length of a transmission opportunity (TXOP) and information on a BSS color ID.

For example, if the EHT PPDU is classified into various types (e.g., EHT PPDU related to SU mode, EHT PPDU related to MU mode, EHT PPDU related to TB mode, EHT PPDU related to Extended Range transmission, etc.), information on the type of EHT PPDU may be included in the version-dependent bits of the U-SIG.

For example, the U-SIG may include information on 1) a bandwidth field containing information on a bandwidth, 2) a field containing information on a MCS scheme applied to EHT-SIG, 3) an indication field containing information related to whether the DCM technique is applied to the EHT-SIG, 4) a field containing information on the number of symbols used for EHT-SIG, 5) a field containing information on whether EHT-SIG is constructed over all bands, 6) a field containing information on the type of EHT-LTF/STF, and 7) a field indicating the length of EHT-LTF and CP length.

Preamble puncturing may be applied to the PPDU of FIG. 13. Preamble puncturing means applying puncturing to some bands (e.g., secondary 20 MHz band) among the entire bands of the PPDU. For example, if an 80 MHz PPDU is transmitted, STA applies puncturing to the secondary 20 MHz band among the 80 MHz band and may transmit PPDU only through the primary 20 MHz band and secondary 40 MHz band.

For example, the pattern of preamble puncturing may be configured in advance. For example, when the first puncturing pattern is applied, puncturing may be applied only to the secondary 20 MHz band within the 80 MHz band. For example, when the second puncturing pattern is applied, puncturing may be applied to only one of the two secondary 20 MHz bands included in the secondary 40 MHz band within the 80 MHz band. For example, when the third puncturing pattern is applied, puncturing may be applied only to the secondary 20 MHz band included in the primary 80 MHz band within the 160 MHz band (or 80+80 MHz band). For example, when the fourth puncturing pattern is applied, within the 160 MHz band (or 80+80 MHz band), there is a primary 40 MHz band included in the primary 80 MHz band, and puncturing may be applied to at least one 20 MHz channel that does not belong to the primary 40 MHz band.

Information about preamble puncturing applied to the PPDU may be included in U-SIG and/or EHT-SIG. For example, the first field of U-SIG may include information on the contiguous bandwidth of the PPDU, and the second field of U-SIG may include information about preamble puncturing applied to the PPDU.

For example, the U-SIG and the EHT-SIG may include information on preamble puncturing based on the following method. If the bandwidth of the PPDU exceeds 80 MHz, the U-SIG may be individually constructed in units of 80 MHz. For example, if the bandwidth of the PPDU is 160 MHz, the PPDU may include a first U-SIG for a first 80 MHz band and a second U-SIG for a second 80 MHz band. In this case, the first field of the first U-SIG includes information on the 160 MHz bandwidth, and the second field of the first U-SIG includes information on preamble puncturing applied to the first 80 MHz band (i.e., information on a preamble puncturing pattern). In addition, the first field of the second U-SIG includes information on a 160 MHz bandwidth, and the second field of the second U-SIG includes information on preamble puncturing applied to a second 80 MHz band (i.e., information on a preamble puncturing pattern). The EHT-SIG following the first U-SIG may include information on preamble puncturing applied to the second 80 MHz band (i.e., information on a preamble puncturing pattern), and the EHT-SIG following the second U-SIG may include information on preamble puncturing applied to the first 80 MHz band (i.e., information on a preamble puncturing pattern).

Additionally or alternatively, the U-SIG and the EHT-SIG may include information on preamble puncturing based on the following method. The U-SIG may include information on preamble puncturing for all bands (i.e., information on a preamble puncturing pattern). That is, EHT-SIG does not include information on preamble puncturing, and only U-SIG may include information on preamble puncturing (i.e., information on a preamble puncturing pattern).

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

The EHT-SIG of FIG. 13 may include control information for the receiving STA. EHT-SIG may be transmitted through at least one symbol, and one symbol may have a length of 4us. Information on the number of symbols used for EHT-SIG may be included in U-SIG.

The EHT-SIG may include technical features of HE-SIG-B described through FIGS. 11 and 12. For example, EHT-SIG, like the example of FIG. 8, may include a common field and a user-specific field. The Common field of the EHT-SIG may be omitted, and the number of user-specific fields may be determined based on the number of users.

As in the example of FIG. 11, the common field of the EHT-SIG and the user-specific field of the EHT-SIG may be coded separately. One user block field included in the user-specific field may contain information for two user fields, but the last user block field included in the user-specific field may contain one or two user fields. That is, one user block field of the EHT-SIG may contain up to two user fields. As in the example of FIG. 12, each user field may be related to MU-MIMO allocation or non-MU-MIMO allocation.

In the same way as in the example of FIG. 11, the common field of the EHT-SIG may include a CRC bit and a Tail bit, The length of the CRC bit may be determined as 4 bits, and the length of the tail bit is determined by 6 bits and may be set to 000000.

As in the example of FIG. 11, the common field of the EHT-SIG may include RU allocation information. RU allocation information may mean information on the location of an RU to which a plurality of users (i.e., a plurality of receiving STAs) are allocated. RU allocation information may be configured in units of 9 bits (or N bits).

A mode in which a common field of EHT-SIG is omitted may be supported. The mode in which the common field of the EHT-SIG is omitted may be referred as a compressed mode. When the compressed mode is used, a plurality of users (i.e., a plurality of receiving STAs) of the EHT PPDU may decode the PPDU (e.g., the data field of the PPDU) based on non-OFDMA. That is, a plurality of users of the EHT PPDU may decode a PPDU (e.g., a data field of the PPDU) received through the same frequency band. When a non-compressed mode is used, multiple users of the EHT PPDU may decode the PPDU (e.g., the data field of the PPDU) based on OFDMA. That is, a plurality of users of the EHT PPDU may receive the PPDU (e.g., the data field of the PPDU) through different frequency bands.

EHT-SIG may be constructed based on various MCS scheme. As described above, information related to the MCS scheme applied to the EHT-SIG may be included in the U-SIG. The EHT-SIG may be constructed based on the DCM scheme. The DCM scheme may reuse the same signal on two subcarriers to provide an effect similar to frequency diversity, reduce interference, and improve coverage. For example, modulation symbols to which the same modulation scheme is applied may be repeatedly mapped on available tones/subcarriers. For example, modulation symbols (e.g., BPSK modulation symbols) to which a specific modulation scheme is applied may be mapped to first contiguous half tones (e.g., 1st to 26th tones) among the N data tones (e.g., 52 data tones) allocated for EHT-SIG, and modulation symbols (e.g., BPSK modulation symbols) to which the same specific modulation scheme is applied may be mapped to the remaining contiguous half tones (e.g., 27th to 52nd tones). That is, a modulation symbol mapped to the 1st tone and a modulation symbol mapped to the 27th tone are the same. As described above, information related to whether the DCM scheme is applied to the EHT-SIG (e.g., a 1-bit field) may be included in the U-SIG. The EHT-STF of FIG. 13 may be used to enhance automatic gain control (AGC) estimation in a MIMO environment or an OFDMA environment. The EHT-LTF of FIG. 13 may be used to estimate a channel in a MIMO environment or an OFDMA environment.

Information on the type of STF and/or LTF (including information on a guard interval (GI) applied to LTF) may be included in the U-SIG field and/or the EHT-SIG field of FIG. 13.

The PPDU (i.e., EHT PPDU) of FIG. 13 may be constructed based on an example of RU allocation of FIGS. 8 to 10.

For example, a EHT PPDU transmitted on a 20 MHz band, that is, a 20 MHz EHT PPDU may be constructed based on the RU of FIG. 8. That is, a RU location of EHT-STF, EHT-LTF, and data field included in the EHT PPDU may be determined as shown in FIG. 8. A EHT PPDU transmitted on a 40 MHz band, that is, a 40 MHz EHT PPDU may be constructed based on the RU of FIG. 9. That is, a RU location of EHT-STF, EHT-LTF, and data field included in the EHT PPDU may be determined as shown in FIG. 9.

The EHT PPDU transmitted on the 80 MHz band, that is, the 80 MHz EHT PPDU may be constructed based on the RU of FIG. 10. That is, a RU location of EHT-STF, EHT-LTF, and data field included in the EHT PPDU may be determined as shown in FIG. 10. The tone-plan for 80 MHz in FIG. 10 may correspond to two repetitions of the tone-plan for 40 MHz in FIG. 9.

The tone-plan for 160/240/320 MHz may be configured in the form of repeating the pattern of FIG. 9 or 10 several times.

The PPDU of FIG. 13 may be identified as an EHT PPDU based on the following method.

The receiving STA may determine the type of the received PPDU as the EHT PPDU based on the following. For example, when 1) the first symbol after the L-LTF signal of the received PPDU is BPSK, 2) RL-SIG in which the L-SIG of the received PPDU is repeated is detected, and 3) the result of applying the modulo 3 calculation to the value of the Length field of the L-SIG of the received PPDU (i.e., the remainder after dividing by 3) is detected as 0, the received PPDU may be determined as a EHT PPDU. When the received PPDU is determined to be an EHT PPDU, the receiving STA may determine the type of the EHT PPDU based on bit information included in symbols subsequent to the RL-SIG of FIG. 13. In other words, the receiving STA may determine the received PPDU as a EHT PPDU, based on 1) the first symbol after the L-LTF signal, which is BSPK, 2) RL-SIG contiguous to the L-SIG field and identical to the L-SIG, and 3) L-SIG including a Length field in which the result of applying modulo 3 is set to 0.

For example, the receiving STA may determine the type of the received PPDU as the HE PPDU based on the following. For example, when 1) the first symbol after the L-LTF signal is BPSK, 2) RL-SIG in which L-SIG is repeated is detected, and 3) the result of applying modulo 3 to the length value of L-SIG is detected as 1 or 2, the received PPDU may be determined as a HE PPDU.

For example, the receiving STA may determine the type of the received PPDU as non-HT, HT, and VHT PPDU based on the following. For example, when 1) the first symbol after the L-LTF signal is BPSK and 2) RL-SIG in which L-SIG is repeated is not detected, the received PPDU may be determined as non-HT, HT, and VHT PPDU.

The PPDU of FIG. 13 may be used to transmit and receive various types of frames. For example, the PPDU of FIG. 13 may be used for (simultaneous) transmission and reception of one or more of a control frame, management frame, or data frame.

NDP Announcement Frame

The NDP announcement frame may have multiple types/variants. For example, the NDP announcement frame may be composed of various formats such as a VHT NDP announcement frame, HE NDP announcement frame, and EHT NDP announcement frame. These formats may be distinguished by the NDP Announce Variant subfield in the sounding dialog token field.

Figure 14:
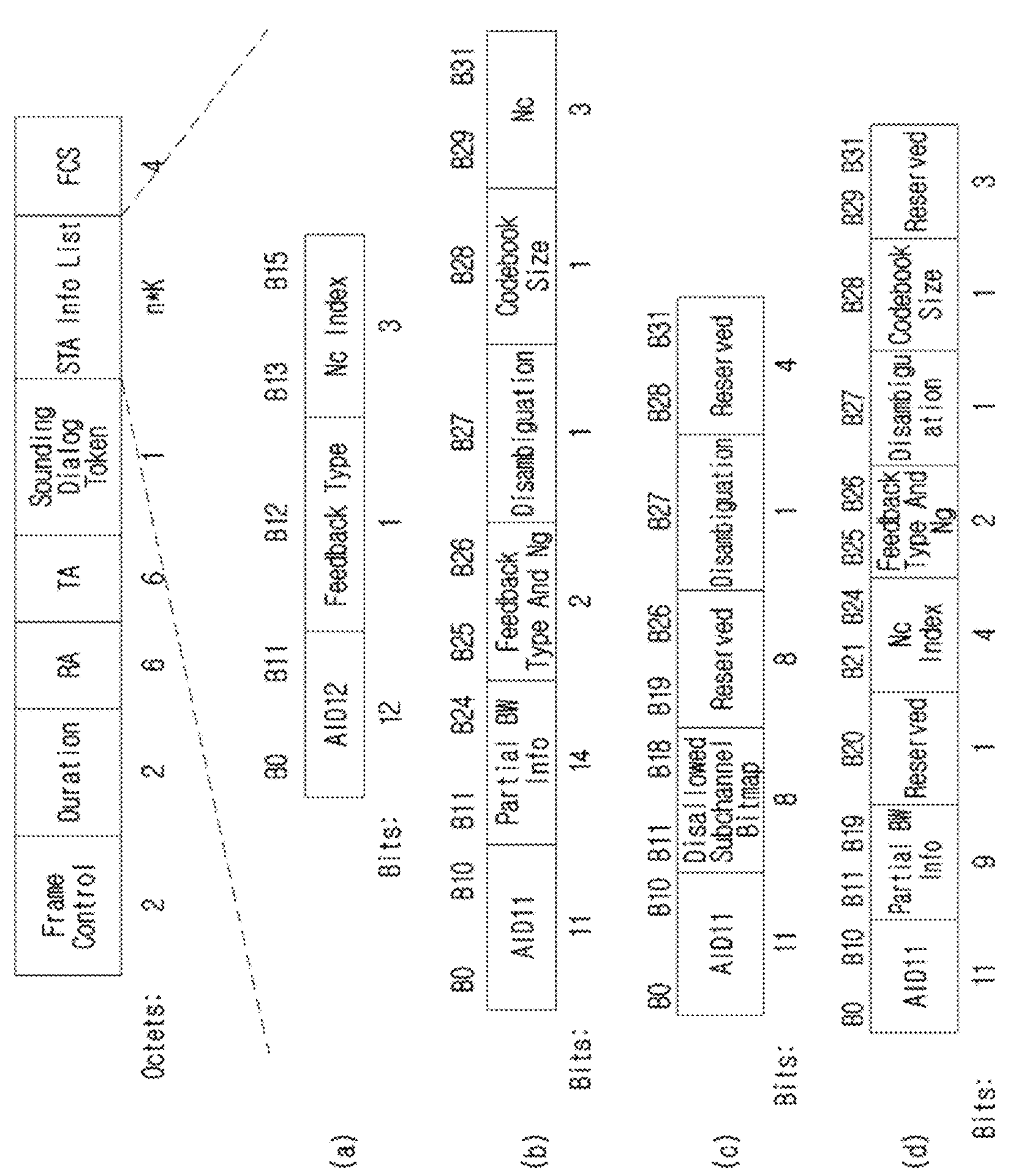
FIG. 14 shows an example format of an NDP announcement frame to which the present disclosure may be applied.

FIG. 14 shows an example format of an NDP announcement frame to which the present disclosure may be applied.

The NDP announcement frame may include one or more STA information (Info) fields. If the NDP announcement frame includes only one STA Info field, the RA (receiver address) field may be set to the address of an STA that can provide feedback. If the NDP announcement frame includes multiple STA Info fields, the RA field may be set to a broadcast address.

The transmitter address (TA) field may be set to the address of the STA transmitting the NDP announcement frame, or may be set to the bandwidth signaling TA (bandwidth signaling TA) of the STA transmitting the NDP announcement frame. for example, in non-HT or non-HT duplicate format, if the scrambling sequence (or scrambling sequence and service field) includes parameters for channel bandwidth, the TA field may be set to bandwidth signaling TA.

Features related to the sounding dialog token field will be described later.

The NDP announcement frame may include n (n is an integer of 1 or more) STA Info fields. One STA Info field has a size of K octets, K=2 in a VHT NDP announcement frame, and K=4 in a HE NDP announcement frame or EHT NDP announcement frame.

As an example in FIG. 14(*a*), the STA Info field of the VHT NDP announcement frame may include AID12, feedback type, and Nc index subfields.

The AID12 subfield includes the 12 least significant bits (LSBs) of the STA's AID that is expected to process the subsequent NDP and prepare for sounding feedback. The feedback type subfield indicates the type of feedback required. If the value is 0, it corresponds to SU, and if the value is 1, it corresponds to MU. When the feedback type is MU, the Nc index subfield indicates a value (i.e., Nc-1) obtained by subtracting 1 from the number of columns (i.e., Nc) in the compressed beamforming feedback matrix. In case of SU, the Nc index field is reserved.

The example of FIG. 14(*b*) shows the format of the STA Info field of the HE NDP announcement frame when the value of the AID11 field is not a specific value (e.g., 2047).

The value of the AID11 subfield other than a specific value (e.g., 2047) includes 11 LSBs among the AIDs of the STA expected to process the subsequent NDP and prepare for sounding feedback.

The partial bandwidth information (partial BW Info) subfield may include a RU start index of 7 bits (B0-B6) and an RU end index of 7 bits (B7-B13).

The Feedback Type and Ng subfields may be combined with the Codebook Size subfield to indicate, for TB (trigger based) sounding, whether SU/MU/CQI feedback is requested, Ng=4 or 16, and quantization resolution. For non-TB sounding, the Feedback Type and Ng subfields and Codebook Size subfields may indicate SU or CQI.

The disambiguation subfield is set to 1, which may help non-HE STAs (e.g., VHT STAs) not misunderstand the field as an AID field.

The Nc subfield is set to the value of Nc-1. If the feedback type is SU or MU, Nc may correspond to the number of columns in the compressed beamforming feedback matrix, and if the feedback type is CQI, Nc may correspond to the number of space-time streams (STS). In the case of an NDP announcement frame that has an AID11 subfield value other than 2047 and is individually addressed to a single STA, the Nc subfield may be reserved.

The example of FIG. 14(*c*) shows the format of the STA Info field of the HE NDP announcement frame when the value of the AID11 field is a specific value (e.g., 2047).

A disallowed subchannel bitmap indicates the 20 MHz subchannel(s) and 242-tone RU(s) present in the sounding NDPs announced by the NDP announcement frame, and the 242-tone RU(s) to be included in the requested sounding feedback.

The example in FIG. 14(*d*) shows the format of the STA Info field of the EHT NDP announcement frame.

The AID11 subfield includes the identifier of the STA expected to process the subsequent NDP and prepare sounding feedback.

The partial bandwidth (BW) subfield may include a 1-bit (B0) resolution subfield and an 8-bit (B1-B8) feedback bitmap. The resolution subfield indicates the resolution bandwidth (e.g., 20 MHz or 40 MHz) for each bit of the feedback bitmap subfield. The feedback bitmap subfield may indicate a request for each resolution bandwidth from low to high frequencies, and the first bit (B1) of the bitmap corresponds to the lowest resolution bandwidth. Each bit of the feedback bitmap is set to 1 when feedback for the corresponding resolution bandwidth is requested.

For TB sounding, the feedback type, Ng subfield, and codebook size subfield may be set according to the example in Table 1.

TABLE 1

| Feedback Type And Ng | | Codebook Size | |
|---|---|---|---|
| B25 | B26 | B28 | Description |
| 0 | 0 | 0 | SU, Ng = 4, quantization resolution (ϕ, ψ) = {4, 2} |
| 0 | 0 | 1 | SU, Ng = 4, quantization resolution (ϕ, ψ) = {6. 4} |
| 0 | 1 | 0 | SU, Ng = 16, quantization resolution (ϕ, ψ) = {4, 2} |
| 0 | 1 | 1 | SU, Ng = 16, quantization resolution (ϕ, ψ) = {6, 4} |
| 1 | 0 | 0 | MU, Ng = 4, quantization resolution (ϕ, ψ) = {7, 5} |
| 1 | 0 | 1 | MII, Ng = 4, quantization resolution (ϕ, ψ) = {9, 7} |
| 1 | 1 | 0 | CQI |
| 1 | 1 | 1 | MU, Ng = 16, quantization resolution (ϕ, ψ) = {9, 7} |

For non-TB sounding, the feedback type, Ng subfield, and codebook size subfield may be set according to the example in Table 2.

TABLE 2

| Feedback Type And Ng | | Codebook Size | |
|---|---|---|---|
| B25 | B26 | B28 | Description |
| 0 | Reserved | Reserved | SU |
| 1 | 1 | 0 | CQI |

The disambiguation subfield is set to 1, which may help prevent non-EHT STAs (e.g., VHT STAs) from misinterpreting the field as an AID field.

In the EHT NDP announcement frame, if it includes one or more STA Info fields, the RA is set to a broadcast address, and the following items may apply. If the feedback type and Ng subfields and the codebook size subfield indicate SU or MU, the Nc index subfield is set to the value of Nc-1. Nc may correspond to the number of columns in the compressed beamforming feedback matrix, and values exceeding 7 in the Nc index subfield may be reserved. If the feedback type and Ng subfields and codebook size subfield indicate CQI, the Nc index subfield may be set to the value of Nc-1, Nc may correspond to the number of space-time streams (STS), and values exceeding 7 in the Nc index subfield may be reserved. There may be more than one STA Info field.

In an EHT NDP announcement frame with a single STA Info field, the RA field is set to an individual address, and the Nc index subfield may be reserved.

Sounding Protocol Sequence

Figure 15:
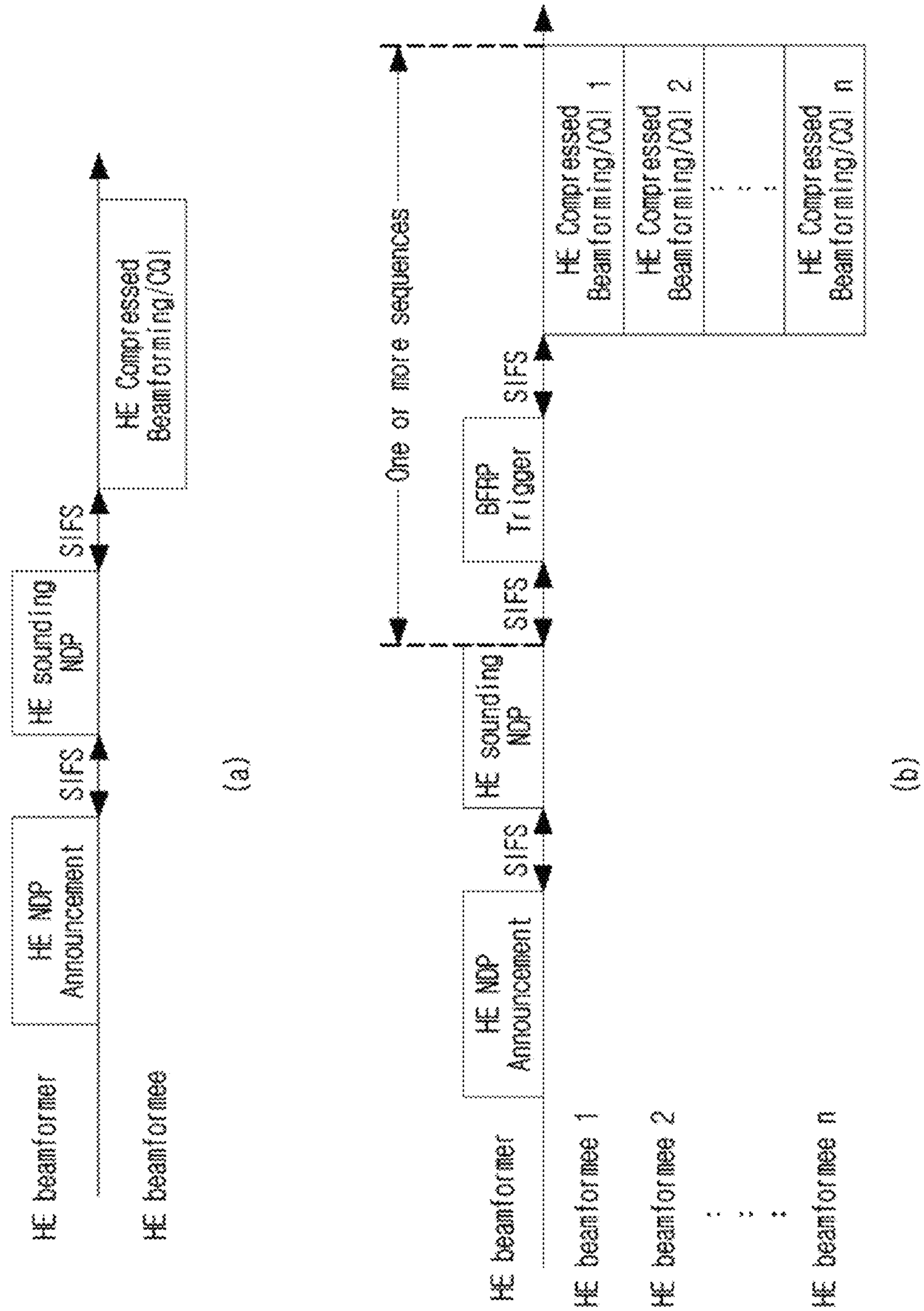
FIG. 15 is a diagram for describing the HE Non-TB/TB sounding procedure to which the present disclosure may be applied.

As shown in (a) of FIG. 15, HE non-trigger based (non-TB) sounding sequence is initiated by a HE beamformer with an individually addressed HE NDP announcement frame including one STA information field, and after SIFS, a HE sounding NDP may be transmitted to the (single) HE beamformer. The HE beamformer may receive the HE sounding NDP from the HE beamformer and, after SIFS, respond by transmitting a HE compressed beamforming/CQI frame to the HE beamformer.

If the STA identified by the RA field is a mesh STA, AP, or IBSS STA, the AID11 subfield of the STA information field may be set to 0 or the AID of the STA identified by the RA field of the HE NDP announcement frame.

Specifically, the HE beamformer that starts the HE non-TB sounding sequence must transmit a HE NDP announcement frame with a single STA information (Info) field, and if the STA identified by the RA field is a mesh STA, AP, or IBSS member STA, the value of the AID 11 field in the corresponding STA information field may be set to 0 or the AID of the STA identified by the RA field rather than 2047. The HE beamformer may initiate a HE non-TB sounding sequence with the HE beamformer to request SU feedback across the entire bandwidth. The HE beamformer may not start HE non-TB with a HE NDP announcement frame with a partial BW information subfield indicating less than the full bandwidth.

As shown in (b) of FIG. 15, the HE TB sounding sequence may be started by a HE beamformer, a HE sounding NDP after SIFS, and a BFRP trigger frame after SIFS using a broadcast HE NDP announcement frame with two or more STA information fields. One or more HE beamformers may receive a BFPR trigger frame and, after SIFS, respond with a HE compressed beamforming/CQI frame. Here, the BFRQ trigger frame may include one or more user information (user info) fields that identify the HE beamformer.

The HE beamformer that starts the HE TB sounding sequence may transmit a HE NDP announcement frame that includes two or more STA information fields and an RA field set as a broadcast address. The HE beamformer may initiate a HE TB sounding sequence to request MU feedback across the entire bandwidth.

The HE beamformer may initiate a HE TB sounding sequence to request a feedback variant only if the feedback variant is calculated based on parameters supported by the HE beamformer. Otherwise, the HE beamformer may not request a feedback variant calculated based on parameters that the HE beamformer does not support.

HE beamformer that transmits the HE NDP announcement frame to the HE beamformer that is an AP, TDLS peer STA, mesh STA, or IBSS STA may include one STA information (info) field in the HE NDP announcement frame and set the AID11 field to 0 in the STA information field of the frame.

A HE beamformer that is an AP and transmits a HE NDP announcement frame to one or more HE beamformers may set the AID11 field of the STA information field identifying the non-AP STA to 11 LSB of the AID of the non-AP STA. The HE NDP announcement frame may not include multiple STA information fields with the same value in the AID11 subfield.

HE beamformer transmitting HE NDP announcement frame starting HE TB sounding sequence may include an STA information field with an AID11 subfield value of 2047 to indicate a disallowed subchannel during punctured channel operation. If the STA information field is present, the STA information field with an AID11 value of 2047 may be the first STA information field of the frame. The HE beamformer transmitting the HE NDP announcement frame may not include one or more STA information fields with an AID11 subfield value of 2047.

As shown in (b) of FIG. 15, the HE beamformer that started the HE TB sounding sequence may transmit another BFRP trigger frame in the same TXOP. The HE beamformer may use an additional BFRP trigger frame to request HE compressed beamforming/CQI reporting that was not processed in the previous BFRP trigger frame or to request retransmission of the HE compressed beamforming/CQI report. The HE beamformer may not transmit a BFRP trigger frame identifying the STA identified in the HE NDP Announcement frame of the HE TB sounding sequence unless it is in the same TXOP as the HE TB sounding sequence.

In the HE TB sounding sequence, STA information field in HE NDP announcement frame requesting SU or MU feedback may indicate the subcarrier grouping (Ng), codebook size, and number of columns (Nc) to be used by the HE beamformer identified by the STA information field for generation of SU or MU feedback. And, in the HE TB sounding sequence, the STA information field of the HE NDP announcement frame requesting CQI feedback may indicate the Nc to be used by the HE beamformer identified by the STA information field for generation of CQI feedback.

Additionally, a trigger dependent common information subfield may not exist in the BFRQ trigger frame. The trigger dependent user information subfield of the BFRQ trigger frame may include feedback segment retransmission. The Feedback Segment Retransmission Bitmap subfield may indicate the requested feedback segment of the HE compressed beamforming report.

If the bit at position n (n=0 for LSB, n=7 for MSB) in the subfield is 1, a feedback segment whose Remaining Feedback Segment subfield of the HE MIMO control field is n may be requested. If the bit at position n in the subfield is 0, the feedback segment whose remaining feedback segment subfield of the HE MIMO control field is n may be requested.

Method for Transmitting and Receiving Feedback Information in Wireless LAN Sensing Procedure Hereinafter, a method for transmitting and receiving feedback information in a wireless LAN sensing procedure will be described.

Specifically, in the wireless LAN sensing procedure, an NDP-based sounding protocol may be used so that one or more sensing STAs exchange wireless LAN signals to measure channel information. The data size of channel status information (CSI) obtained using this NDP-based sounding protocol may be larger than the data size that the STA can transmit per unit time. The present disclosure describes how a sensing STA divides/forms CSI feedback into one or more fragments or segments and transmits them.

Figure 16:
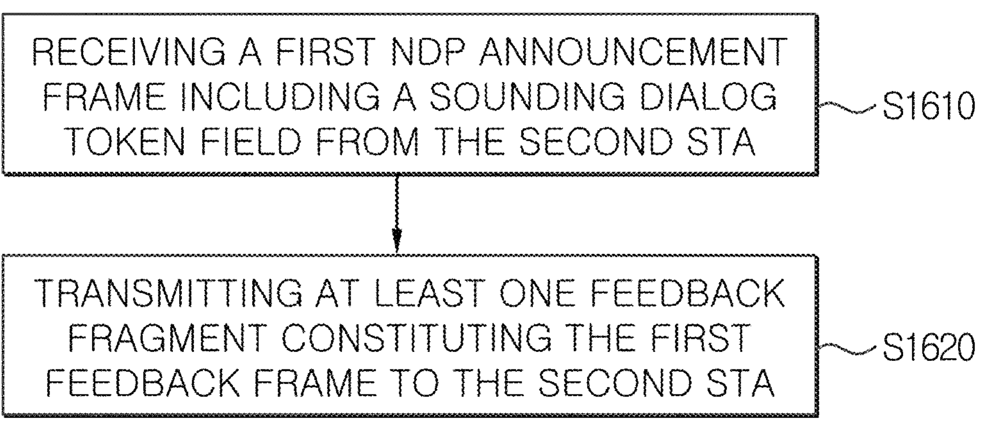
FIG. 16 is a diagram illustrating a process in which a first STA performs a sensing procedure, according to an embodiment of the present disclosure.

FIG. 16 is a diagram illustrating a process in which a first STA performs a sensing procedure, according to an embodiment of the present disclosure.

The first STA may receive a first null data physical protocol data unit (PPDU) announcement frame including a sounding dialog token field from the second STA (S1610).

Here, the sounding dialog token field may include information indicating that the variant (or type) of the first NDP announcement frame is a sensing NDP announcement frame and the first sounding dialog token number. Modification of the first NDP announcement frame may be indicated by the first bit (B0) to the third bit (B2) of the sounding dialog token field of the first NDP announcement frame.

And, the first NDP announcement frame may be received in the first sensing burst (or measurement instance) section. At this time, the first sensing burst may be one of one or more sensing buses included in the first sensing session. And, the first sounding dialog token number may correspond to the first sensing burst. Accordingly, sounding dialog token numbers corresponding to one or more bursts included in the first sensing session may be different.

The first STA may transmit at least one feedback fragment constituting the first feedback frame to the second STA (S1620).

Specifically, the first feedback frame may include channel status information (CSI) obtained through NDP transmitted by the first NDP announcement frame. The first feedback frame may be divided/separated into at least one feedback fragment. The first STA may transmit at least one feedback fragment to the second STA within a unit time.

And, one or more feedback fragments may be transmitted based on the first trigger frame including the first sounding dialog token number. That is, the first trigger frame may include the first sounding dialog token number included in the first NDP announcement frame transmitted within the first sensing session/first sensing burst.

Accordingly, the first trigger frame may trigger transmission of channel state information obtained through NDP transmitted by the first NDP announcement frame. Accordingly, the first trigger frame may be transmitted to the second STA in the first sensing session/first sensing burst, but is not limited thereto and may be transmitted in another sensing burst or another sensing session.

At least one of the maximum number of one or more feedback fragments (i.e., the maximum number of feedback fragments obtained by dividing the first feedback frame) or the size of the first feedback frame may be indicated by at least one of a sensing capability field, a sensing report field, or a feedback control field.

And, as an example of the present disclosure, the first trigger frame may further include at least one of information indicating a first sensing session (e.g., ID of the first sensing session) and information indicating a first feedback fragment among one or more feedback fragments.

That is, the second STA may trigger reporting of the first feedback fragment obtained (i.e. by NDP transmitted by the first NDP announcement frame) based on the first NDP announcement frame transmitted within the first sensing burst during the first sensing session by transmitting a first trigger frame containing information indicating the first sensing session ID, the first sounding dialog token number, and the first feedback fragment to the first STA.

Additionally or alternatively, each of the one or more feedback fragments may include at least one of information representing the first sensing session, a first sounding dialog token number, or an index of each of the one or more feedback fragments.

As another example, the first sensing session may include a second sensing burst following the first sensing burst. Based on a second trigger frame containing the first sounding dialog token number being received from the second STA in the second sensing burst section, the first STA may transmit one or more feedback fragments constituting the first feedback frame to the second STA.

That is, the second STA transmits a feedback frame including the first sounding dialog token number not only in the first sensing burst but also in other sensing bursts, thereby triggering transmission of one or more feedback fragments constituting the first feedback frame.

As another example, when a third trigger frame including information representing a second sensing session, a second sounding dialog token number, and information representing a second feedback fragment is received from the second STA, the first STA may transmit the second feedback fragment obtained in the third sensing burst corresponding to the second sounding dialog token number during the second sensing session to the second STA.

Figure 17:
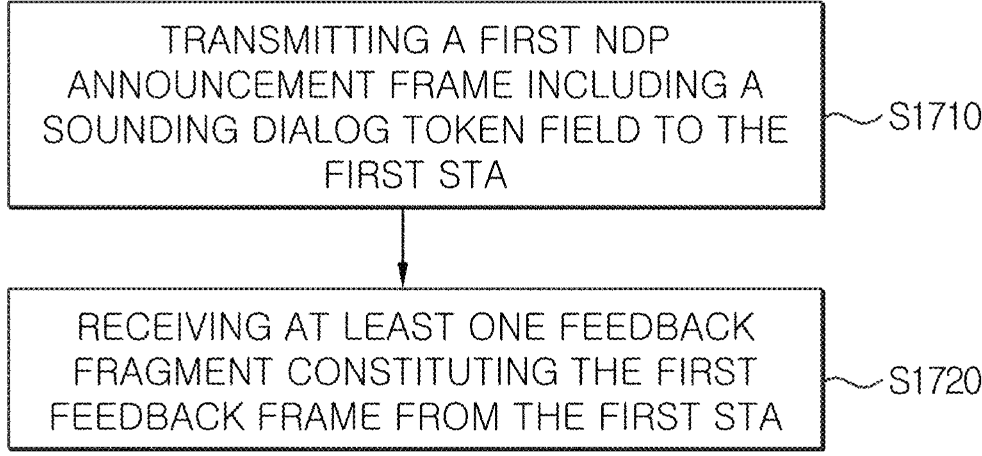
FIG. 17 is a diagram illustrating a process in which a second STA performs a sensing procedure, according to an embodiment of the present disclosure.

FIG. 17 is a diagram illustrating a method by which a second STA performs a sensing procedure, according to an embodiment of the present disclosure.

The second STA may transmit the first NDP announcement frame including the sounding dialog token field to the first STA (S1710).

And, the second STA may receive at least one feedback fragment constituting the first feedback frame from the first STA (S1720).

Since the first NDP announcement frame and the first feedback transmission/reception operation, etc. have been described with reference to S1610 and S1620 of FIG. 16, redundant description will be omitted.

Hereinafter, a method for transmitting and receiving feedback information in the wireless LAN sensing procedure will be described in more detail.

In order to increase the accuracy and resolution of wireless LAN sensing, a wireless LAN sensing procedure using signal transmission and reception channels between multiple sensing STAs may be performed. In order for a sensing initiator and multiple sensing responders to efficiently perform a wireless LAN sensing procedure using signal transmission and reception channels, channel estimation for each transmission and reception channel may be required.

Here, the sensing initiator refers to an STA that instructs one or more STAs with a sensing function (or capability) to initiate a sensing session. And, a sensing responder refers to an STA participating in a sensing session initiated by a sensing initiator.

In order to efficiently perform channel measurement for the transmission and reception channels used in the above-described wireless LAN sensing, a channel estimation operation based on NDP transmission can be used. The NDP transmission-based channel estimation operation may be performed as a non-trigger based (TB) channel measurement operation or may be performed as a TB channel measurement operation. FIG. 18 illustrates a non-TB/TB channel measurement operation performed by a sensing initiator and one or more sensing responders.

For example, an STA that performed a non-TB/TB channel measurement operation may measure information about the channel that received the NDP, that is, CSI. At this time, the data size of the measured CSI (e.g., CSI raw data without compression applied or/and CSI with compression applied) may be larger than the data size that the STA may transmit and receive in unit time, and accordingly, the STA may not be able to transmit the CSI at once.

Embodiment 1

Embodiment 1 is an embodiment of an STA's CSI data reporting method when the size of the measured CSI data is larger than the data that the STA can transmit and receive in unit time.

In order to efficiently transmit and receive large-sized feedback information (e.g., CSI data), the feedback information may be configured/formed into multiple fragments (or segments) and fed back. For example, as shown in FIG. 19, feedback information may be divided/organized into one or more fragments.

Information related to one or more fragments constituting feedback information (e.g., maximum number of fragments, size of fragments, etc.) may be transmitted through at least one of an NDP announcement frame, trigger frame, or feedback frame.

For example, when the feedback information is CSI, the size of the CSI segment or CSI fragment may be set smaller than the maximum MPDU size that can be transmitted and received by an STA of a specific format (e.g., STA of the IEEE 802.11bf standard).

And, the feedback information may consist of up to 8 fragments (or segments). Accordingly, the number of fragments may be transmitted through ⅔ bit information set on the sensing capability field or/and the sensing report/feedback control field. However, it is not limited to this, and the maximum number of segments or fragments constituting the feedback information and the size of the information indicating the number of corresponding fragments may be changed.

For example, when the maximum number of fragments is indicated by 2-bit information, the maximum number of fragments may be indicated as shown in Table 3 below. When the maximum number of fragments is indicated as 1, it means that the feedback information is not divided into fragments and is transmitted as one piece of data.

TABLE 3

| Bit value (index) | (maximum) number of fragments |
|---|---|
| 0 (00) | 1 |
| 1 (01) | 2 |
| 2 (10) | 4 |
| 3 (11) | 8 |

As another example, differently from Table 3, a 2-bit value may mean an exponent value (m) for 2, and $2^m$ may mean the maximum number of fragments.

As another example, when the maximum number of fragments is indicated by 3-bit information, the maximum number of fragments may be indicated as shown in Table 4 below.

TABLE 4

| Bit value (index) | (maximum) number of fragments |
|---|---|
| 0 (000) | 1 |
| 1 (001) | 2 |
| 2 (010) | 3 |
| 3 (011) | 4 |
| 4 (100) | 5 |
| 5 (101) | 6 |
| 6 (110) | 7 |
| 7 (111) | 8 |

When feedback is provided using a fragment (or segment), the sensing capability field may include a max A-MPDU length exponent field indicating the length of the maximum (max) A (aggregated)-MPDU and an MPDU length field indicating the length of the entire MPDU to transmit and receive feedback.

At this time, the max A-MPDU length index field may be set to the same value as the value of the field indicating the number of fragments (or segments). Accordingly, the max A-MPDU length index field consists of 2/3 bits, and an index value of 2 can be used when calculating the length. The MPDU field may be composed of 2 bits to indicate the size of the entire MPDU, but is not limited to this.

As mentioned above, if fragmented (or segmented) feedback information (i.e., feedback fragment/feedback segment) is not transmitted at once or all at once, the transmitter and receiver may exchange the feedback information through sending and receiving multiple feedback reports.

Here, the transmitter may include a sensing transmitter or a sensing initiator, which is an STA that transmits a PPDU used for sensing measurements in a wireless LAN sensing procedure. The receiver may include a sensing receiver or a sensing responder that receives the PPDU and performs sensing measurement.

Additionally, the total transmission and reception time for all feedback fragments (or feedback segments) may exceed the TXOP set for sensing measurement and reporting. Here, TXOP means a time interval in which a specific STA has the right to start a frame exchange sequence on a wireless medium. Embodiments described later may be applied for efficient transmission and reception of feedback fragments and identification of the corresponding feedback fragment.

Embodiment 2

Embodiment 2 is an embodiment of a method for transmitting, receiving and identifying a feedback fragment. Specifically, as shown in FIGS. 18 and 19, channel state information (i.e., CSI) measured through non-TB and TB channel measurements may be divided into multiple feedback fragments. Embodiment 2 describes the procedures performed by the transmitter and receiver to transmit and receive divided feedback fragments.

As shown in FIG. 18, before the NDP used for sensing measurement is transmitted, the transmitter may transmit an NDP announcement frame to the receiver. The NDP announcement frame may include one or more fields to indicate a feedback fragment.

For example, an NDP announcement frame may include a sounding dialog token field, which may consist of 1 octet. Among the 8 bits constituting the field, MSB 2/3 bits can be set as the NDP Announcement Variant subfield indicating the type/variant/format of the NDP Announcement frame. For example, the NDP Announcement Variant subfield may indicate that a specific NDP Announcement frame is an NDP Announcement frame for channel sensing measurement (i.e., a sensing NDP Announcement frame).

For example, if the NDP Announcement Variant subfield consists of the MSB 3 bits (B0, B1, B2) of the Sounding Dialog Token field, the corresponding subfield may be configured as shown in Table 5 below to indicate the type/variant/format of the NDP announcement frame. Except for the MSB 3 bit values shown in Table 5, the remaining combinations may be reserved. However, this is only one embodiment, and the type/variant/format of each NDP announcement frame may be indicated by different bit values.

TABLE 5

| B0 | B1 | B2 | Content (i.e., NDP announcement Frame Variant) |
|---|---|---|---|
| 0 | 0 | 0 | VHT NDP announcement frame |
| 0 | 1 | 0 | HE NDP announcement frame |
| 1 | 0 | 0 | Ranging NDP announcement frame |
| 1 | 1 | 0 | EHT NDP announcement frame |
| 1 | 1 | 1 | Sensing NDP announcement frame |

In the sounding dialogue token field, the remaining bits excluding the NDP announcement variant subfield (i.e., the remaining bits excluding the MSB 2/3 bits) may be configured as a sounding dialogue token number subfield. In order to identify that it is an NDP measurement transmitted by a specific NDP announcement frame, the corresponding subfield may be used to indicate that it is a channel measurement by transmitting a specific NDP announcement frame. Specifically, each NDP announcement frame may be indicated by a specific value by the sounding dialog token number subfield, and the specific value may be used to distinguish each NDP announcement frame. Accordingly, the transmitter and receiver may use the value indicated through the sounding dialog token number subfield to identify which NDP the measured channel information used was transmitted after transmission of an NDP announcement frame.

For example, if the sounding dialog token number subfield is set to 5 bits (e.g., B3 to B7), a total of 32 NDP announcement frame transmissions can be distinguished.

Sounding dialog token field indicating the sounding dialog token number may be transmitted not only in the NDP announcement frame but also in a feedback frame for feedback transmission and/or a trigger frame for triggering the feedback frame (e.g., a sensing report trigger frame, etc.).

At this time, the sounding dialog token number included in the feedback frame and the trigger frame may be set to be the same as the sounding dialog token number set by the NDP announcement frame.

For example, assume that the value of the sounding dialog token number is set to 15 when transmitting the first NDP announcement frame. At this time, the feedback frame, control frame, trigger frame, or/and report control field/report field corresponding to the first NDP announcement frame (or/and the first NDP by 1st NDP announcement frame) includes a sounding dialog token field, and the sounding dialogue token number on the corresponding sounding dialogue token field may be set to 15, the same as the value set in the first NDP announcement frame.

That is, the sounding dialog token number included in each frame (e.g., NDP announcement frame, trigger frame, feedback frame, or/and reporting control field/report field) associated with a specific NDP transmission may be set to the same value.

As an example, the sounding dialog token number may be used to indicate/identify that specific channel information is channel information measured using NDP transmitted after a specific NDP announcement frame is transmitted and SIFS.

When referring to (b) of FIG. 18, assume that the sounding dialog token field included in NDPA_1 (i.e., the first NDP announcement frame) indicates a sounding dialog token number set to 7. Here, Trigger 1 (i.e., first trigger frame) according to NDPA_1 and the measurement feedback frame transmitted from each receiver (e.g., receiver 1, receiver 2, . . . receiver n) according to Trigger 1 may include a sounding dialog token number set to 7. That is, each frame associated with NDP_1 transmitted according to NDPA_1 may include a sounding dialog token number of the same value.

Embodiment 2-1

One sensing session for performing sensing measurements may consist of one or more sensing bursts (or measurement instances).

Here, a sensing session refers to a time period (or instance) in which a series of sensing procedures are performed. In other words, a sensing session refers to a time interval (or instance) in which various protocols related to the transmission and reception of signals for sensing are exchanged, or an instance of a sensing procedure having associated operational parameters of the instance. Sensing sessions may be allocated to STAs periodically or aperiodically as needed.

One or more NDP announcement frames and NDP frame transmission operations may be performed within one sensing burst. For example, if a sensing session consists of three sensing bursts, a first NDP announcement frame and a first NDP transmission are performed in the first sensing burst, a second NDP announcement frame and a second NDP transmission are performed in the second sensing burst, and a third NDP announcement frame and a third NDP transmission may be performed in the third sensing burst.

In addition, channel measurement information corresponding to the NDP announcement frame and NDP transmission may be reported/feedback after NDP announcement frame and NDP transmission for each sensing burst, or channel measurement information measured after all NDP announcement frames and NDP transmission are completed may be reported/feedback. At this time, the sounding dialog token number can be used to indicate which sensing burst the fed back measurement information for each channel corresponds to.

The sounding dialog token number used in different sensing bursts (i.e., the sounding dialog token number included in the NDP announcement frame transmitted in each sensing burst) may be different. That is, the sounding dialog token number used for each sensing burst included in one sensing session may be different.

The STA can identify which sensing burst (and/or which NDP) the specific channel measurement information (e.g., CSI) fed back through the sounding dialog token number included in NDP announcement frame, feedback frame, reporting control field, or reporting field corresponds to. Additionally, the STA may request desired information when retransmitting CSI using the sounding dialog token number.

Additionally, since specific channel measurement information (e.g., CSI) can be identified through the sounding dialog token number, the sensing STA/AP may request specific channel measurement information even outside of the corresponding sensing burst section. That is, the sensing STA/AP may request channel measurement information prior to the currently transmitted/in-progress sensing burst from the STA that performed the sensing operation using the sounding dialog token number.

When requesting specific channel measurement information (i.e., feedback information), the sensing STA/AP may transmit the sounding dialog token number related to the specific channel measurement information by including it in the trigger frame or feedback request frame. The operation of a sensing STA/AP transmitting a sounding dialog token number related to specific channel measurement information by including it in a trigger frame or feedback request frame may be effective within one sensing session.

As another example, the sounding dialog token number may be used together with a sensing session ID or sensing session indication information for more flexible transmission and reception of feedback information. That is, in order to identify which sensing session/sensing burst the channel measurement information to be requested was obtained from, the sensing session ID/sensing session indication information and the sounding dialog token number may be used together.

Here, the sensing session ID/sensing session indication is used to identify the sensing session, and may be transmitted by being included in at least one of the above-described NDP announcement frame, trigger frame, feedback report control field, or report field. Additionally, the sensing session ID/sensing session indication field may consist of 2/3/4 bits, but is not limited thereto.

As an example, when referring to (b) of FIG. 18, the trigger frame transmitted to request feedback of channel measurement information may include 1) sensing session ID/sensing session indication information, 2) sounding dialog token number, and 3) feedback fragment information.

In addition, (b) of FIG. 18 is an example, and the trigger frame may be transmitted after the NDP is transmitted and an interval other than the SIFS interval.

Additionally, the information 1) to 3) included in the trigger frame may be information related to a sensing burst other than the sensing burst through which NDPA_1 and/or NDP_1 was transmitted. That is, the trigger frame may include information requesting a specific feedback fragment among channel measurement information obtained from a specific sensing burst included in a specific session ID.

As another example, the trigger frame may include all of information 1) to 3) related to the sensing burst through which NDPA_1 and/or NDP_1 was transmitted and other sensing bursts.

Embodiment 2-2

The sensing STA/AP may perform channel measurement by transmitting a trigger frame and requesting NDP transmission. Therefore, when the responder STA transmits a trigger frame to request NDP transmission from the sensing sender, the responder STA may transmit the trigger frame including the sounding dialog token number. At this time, the sounding dialog token number field or sounding dialog token number information may consist of 5/6 bits, but is not limited to this.

Also, assume that the responder STA transmits a trigger frame including a sounding dialog token number, and the sensing sender transmits the NDP by the trigger frame. When feeding back channel state information measured through the corresponding NDP, the respondent STA may transmit the sounding dialog token number set to the same value as the sounding dialog token number included in the trigger frame in the feedback frame or report frame.

As another example, for more flexible feedback transmission, the trigger frame may be configured to include a sensing session ID or sensing indication field.

As with each embodiment of the present disclosure described above, the sensing STA may transmit and receive desired feedback information by including sensing session information (e.g., specific sensing session ID or instruction field), sounding dialog token (i.e., information representing a specific sensing burst within a sensing session), or/and fragment information (i.e., information that represents part of the feedback information) in the NDP announcement frame/trigger frame/feedback frame/report control field or report field.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system, 5G system, but may be applied to various WLAN or wireless communication systems other than the IEEE 802.11-based system.

What is claimed is:

1. A method comprising:

receiving, by a first station (STA) from a second STA, a first null data physical layer protocol data unit (NDP) announcement frame including a sounding dialog token field;

receiving, by the first STA from the second STA, a first NDP based on the first NDP announcement frame; and based on a size of channel state information (CSI) obtained through the first NDP exceeding a threshold, transmitting, by the first STA to the second STA, a report frame including a plurality of segments of the CSI and information related to a number of the plurality of segments, wherein the sounding dialog token field includes information related to whether a variant of the first NDP announcement frame is a sensing NDP announcement frame and a first sounding dialog token number.

2. The method of claim 1, wherein:

a first trigger frame is received from the second STA after the CSI is obtained through the first NDP, transmission of the report frame is triggered based on the first trigger frame, a first sensing session includes at least one sensing burst, the first NDP announcement frame is received in a first sensing burst among the at least one sensing burst, and the first sounding dialog token number corresponds to the first sensing burst.

3. The method of claim 2, wherein:

the first trigger frame includes at least one of information indicating the first sensing session and information indicating a first segment among the plurality of segments.

4. The method of claim 2, wherein:

each of the plurality of segments includes at least one of information indicating the first sensing session, the first sounding dialog token number, or an index of each of the plurality of segments.

5. The method of claim 2, wherein:

the at least one sensing burst includes a second sensing burst following the first sensing burst, and based on a second trigger frame including the first sounding dialog token number being received from the second STA in the second sensing burst, the plurality of segments are transmitted to the second STA.

6. The method of claim 1, wherein:

based on a third trigger frame including information indicating a second sensing session, a second sounding dialog token number, and information indicating a second segment being received from the second STA, the second segment obtained in a third sensing burst corresponding to the second sounding dialog token number during the second sensing session is transmitted to the second STA.

7. The method of claim 1, wherein:

the variant of the first NDP announcement frame is indicated by a first bit (B0) to a third bit (B2) of the sounding dialog token field of the first NDP announcement frame.

8. The method of claim 1, wherein:

the first STA is a non-AP STA, and the second STA is an access point (AP).

9. A first station (STA) comprising:

at least one transceiver; and at least one processor connected to the at least one transceiver, wherein the at least one processor is configured to:

receive, from a second STA through the at least one transceiver, a first null data physical layer-protocol data unit (NDP) announcement frame including a sounding dialog token field;

receive, from the second STA through the at least one transceiver, a first NDP based on the first NDP announcement frame;

based on a size of channel state information, CSI, obtained through the first NDP exceeding a threshold, transmit, to the second STA through the at least one transceiver, a report frame including a plurality of segments of the CSI and information related to a number of the plurality of segments, wherein the sounding dialog token field includes information related to whether a variant of the first NDP announcement frame is a sensing NDP announcement frame and a first sounding dialog token number.

10. A second station (STA) comprising:

at least one transceiver; and at least one processor connected to the at least one transceiver, wherein the at least one processor is configured to:

transmit, to a first STA through the at least one transceiver, a first null data physical layer protocol data unit (NDP) announcement frame including a sounding dialog token field;

transmit, to the first STA through the at least one transceiver, a first NDP based on the first NDP announcement frame;

based on a size of channel state information, CSI, obtained through the first NDP exceeding a threshold, receive, from the first STA through the at least one transceiver, a report frame including a plurality of segments of the CSI and information related to a number of the plurality of segments, wherein the sounding dialog token field includes information related to whether a variant of the first NDP announcement frame is a sensing NDP announcement frame and a first sounding dialog token number.

* * * * *